(12) United States Patent
Barber et al.

(10) Patent No.: US 8,234,058 B1
(45) Date of Patent: Jul. 31, 2012

(54) SYSTEM, MODULE, AND METHOD FOR GENERATING PROCEDURE DATA USED IN AN AVIONICS SYSTEM

(75) Inventors: Sarah Barber, Cedar Rapids, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 996 days.

(21) Appl. No.: 12/283,399

(22) Filed: Sep. 8, 2008

(51) Int. Cl.
- G06G 7/70 (2006.01)
- G06G 7/76 (2006.01)
- G06F 19/00 (2011.01)

(52) U.S. Cl. ........................................................ 701/120

(58) Field of Classification Search .................. 701/3–7, 701/10–11, 15–16, 120–122; 73/178 T; 340/947–948, 951, 959; 244/183–188
See application file for complete search history.

(56) References Cited

U.S. PATENT DOCUMENTS

| | | | |
|---|---|---|---|
| 6,163,744 A * | 12/2000 | Onken et al. .................... 701/3 |
| 6,567,728 B1 * | 5/2003 | Kelly et al. .................... 701/9 |
| 6,643,580 B1 * | 11/2003 | Naimer et al. ................. 701/467 |
| 6,691,004 B2 * | 2/2004 | Johnson et al. ................. 701/14 |
| 6,785,594 B1 * | 8/2004 | Bateman et al. .................. 701/9 |
| 6,816,780 B2 * | 11/2004 | Naimer et al. ................. 701/467 |
| 7,302,318 B2 * | 11/2007 | Gerrity et al. .................... 701/16 |
| 7,346,437 B2 * | 3/2008 | Petillon ............................ 701/3 |
| 7,366,591 B2 * | 4/2008 | Hartmann et al. ................. 701/4 |
| 7,499,771 B2 * | 3/2009 | Caillaud .......................... 701/3 |
| 7,852,236 B2 * | 12/2010 | Feyereisen et al. ........... 340/971 |
| 7,899,586 B2 * | 3/2011 | Markiton et al. .............. 701/16 |
| 2007/0005199 A1 * | 1/2007 | He ................................... 701/16 |
| 2009/0112464 A1 * | 4/2009 | Belcher ......................... 701/210 |
| 2010/0070109 A1 * | 3/2010 | Little et al. ....................... 701/3 |

* cited by examiner

*Primary Examiner* — Khoi Tran
*Assistant Examiner* — Harry Oh
(74) *Attorney, Agent, or Firm* — Donna P. Suchy; Daniel M. Barbieri

(57) ABSTRACT

A present novel and non-trivial system, module, and method for generating final approach, missed approach, and departure data for use in an avionics system. A processor receives navigation data and object data, where object data includes terrain data and/or obstacle data. A flight path is defined, an obstacle clearance surface is constructed and examined for object penetration, and procedure data is generated and provided to at least one avionics system. For approach procedures, a decision altitude data is determined from which the procedure data is generated. A penetrated obstacle clearance surface is allowable if a remedy exists to address the penetration. Remedies may include the use of minimum obstacle clearance criteria, an iterative process, a path construction function, an existing departure procedure, and the use of input factors to determine a real-time estimated climb performance which could affect the climb gradient of a missed approach path.

48 Claims, 17 Drawing Sheets

Formula 4-1
S = 102/GPA

Formula 4-2
D(PFAF) = r*(π/2-π/180-asin((cos(GPA*π/180)*(r+LTP(elev)+TCH))/(r+alt(min))))

Formula 4-3
d = 954 – GPI, where
GPI = TCH/(tan(GPA*π/180)) &
d ≥ 0

Formula 4-4
W(w) = 0.036*D+392.8

Formula 4-5
W(x) = 0.10752*D+678.5

Formula 4-6
W(y) = 0.15152*D+969.7

Formula 4-7
Z(w) = (D-(D(o)+d))/S

Formula 4-8
Z(x) = Z(w) + (D(xp)-W(w))/4

Formula 4-9
Z(y) = Z(w) + (W(x)-W(w))/4 + (D(yp)-W(x))/7

Formula 4-11
Q(x) = (D(xp)-W(w))/4

Formula 4-12
Q(y) = (W(x)-W(w))/4 + (D(yp)-W(x))/7

Formula 4-10
Z(we) = (((r+LTP(elev)-(GPA*(D(o)+d))/102*cos(atan(GPA/102)))/cos((D-(D(o)+d))/r+atan(GPA/102)) - r

FIG. 4A

Formula 4-13

$O(ee) = Z(obs) - ((r + LTP(elev)) * (1/\cos(D(obs)/r) - 1) + Q$

Formula 4-14

$DA = HATh + LTP(elev)$

Formula 4-15

$D(DA) = r*(\pi/2 - GPA*\pi/180 - \mathrm{asin}((\cos(GPA*\pi/180)*(r + LTP(elev) + TCH))/(r + DA)))$ Formula 4-16a $GPA(rev) = 102/RS$, where $RS = 1/\tan(\mathrm{acos}((SRD^2 + (r + LTP(elev))^2 - (r + O(ee))^2)/(2*SRD*(r + LTP(elev)))) - \pi/2$ &

$SRD = ((r + O(ee))^2 + (r + LTP(elev))^2 - 2*(r + O(ee))^2*(r + LTP(elev))*\cos((D - (200 + d))/r))^{0.5}$ Formula 4-16b $GPA(rev) = 102*(D - (200 + d)/S + p)/(D - 200 + d)$ Formula 4-17

$TCH(adj) = \tan(GPA*\pi/180)*(102*p)/GPA$, where $p \leq Z(relief)$ &

$Z(relief) = (d*GPA)/102$

Formula 4-18

$DA(adj) = ((r + LTP(elev) + TCH)*\cos(GPA*\pi/180)/\cos(D(adj)/r + GPA*\pi/180) - r$, where $D(adj) = r*(\pi/2 - \mathrm{atan}(GPA/102) - \mathrm{asin}((\cos(\mathrm{atan}(GPA/102))*(r + LTP(elev)) - GPA*(200 + d)/102)/(r + O(ee))))$

FIG. 4B

Formula 6-1 (2-22)

$S(ma) = 1852/(0.3048*(CG-48))$

Formula 6-2 (5-16 modified for variables)

$W(1bw) = D(1b)*(W(1b)-W(1aw))/L(1b)+W(1aw)$

Formula 6-3 (5-19 mod)

$W(1bx) = D(1b)*(W(1b)-W(1ax))/L(1b)+W(1ax)$

Formula 6-4 (5-21 mod)

$W(1by) = D(1b)*(W(1b)-W(1ay))/L(1b)+W(1ay)$

Formula 6-5 (5-18)

$Z(1bw) = (r+Z(a1))*e^{\wedge}(D(1b)/S(1b)*r))-r$

Formula 6-6 (5-20)

$Z(1bx) = Z(1bw) + (D(1bxp)-W(1bw))/4$

Formula 6-7 (5-22)

$Z(1by) = Z(1bx) + (D(1byp)-W(1bx))/7$

Formula 6-8 (see FIG. 4A, Formula 4-11)

$Q(1bx) = (D(1bxp)-W(1bw))/4$

Formula 6-9 (see FIG. 4A, Formula 4-12)

$Q(1by) = (W(1bx)-W(1bw))/4 + (D(1byp)-W(1bx))/7$

Formula 6-10 (5-24)

$DA(1badj) = \tan(GPA*\pi/180)*(D(DA)+D(1badj))+LTP(elev)+TCH$, where $D(1badj) = 2907*p/(S(1b)*GPA+102)$

FIG. 6

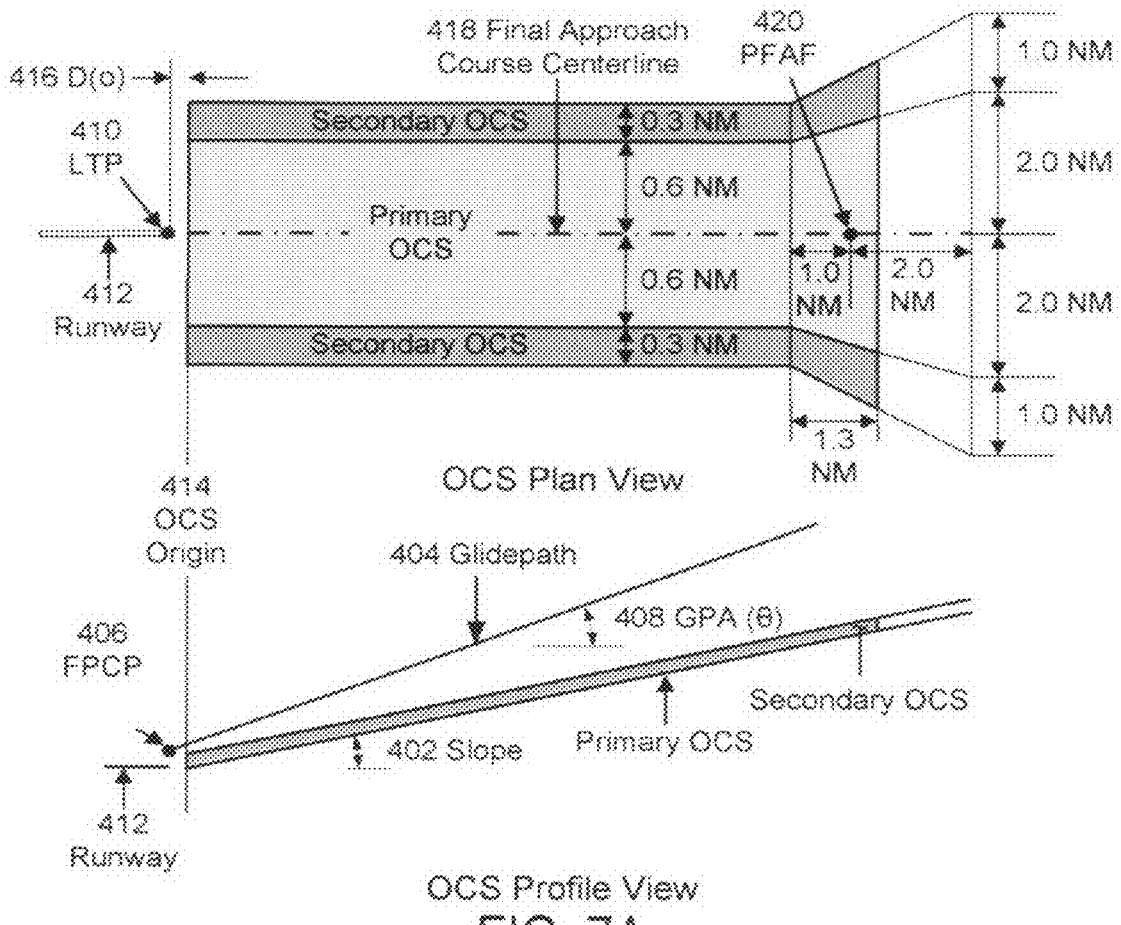
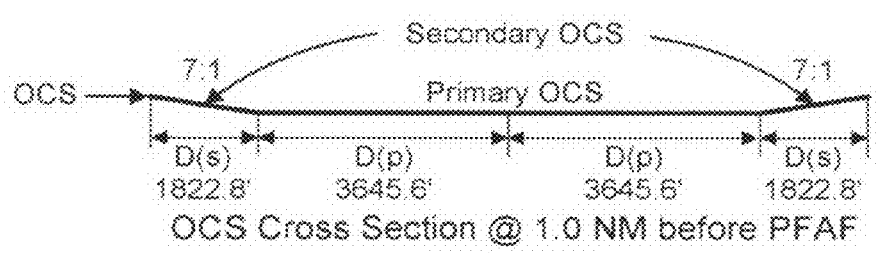
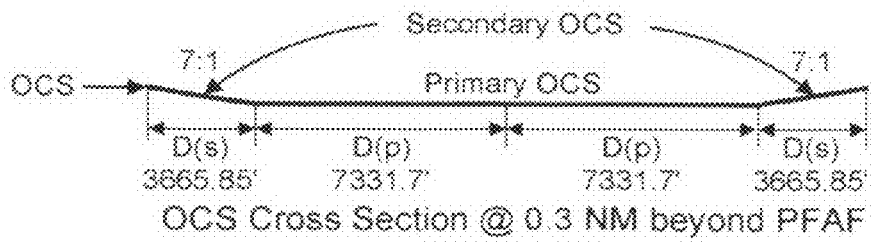

Formula 8-1

$S = 1/(\tan(GPA*\pi/180)*(0.928+0.0038*(ACT°C - ISA°C)))$, where $ISA°C = 15-0.00198*Elevation$

Formula 8-2

$D(o) = (250-TCH)/\tan(GPA*\pi/180)$

Formula 8-3

$D(PFAF) = (\ln((r+alt(min))/(r+LTP(elev)+TCH))*r)/\tan(GPA*\pi/180)$

Formula 8-4

$W(p) = 0.4667*((D-D(PFAF)+6076)+3645.6$

Formula 8-5

$W(s) = W(p) + 0.2333*((D-D(PFAF)+6076)+1822.8$

Formula 8-6

$D(OCS) = D(o)+r*\ln((LTP(elev)+89+r)/(r+LTP(elev)))$

Formula 8-7

$Z(p) = (r+LTP(elev))*e^{((D-D(o)/(r*S))}-r$

Formula 8-8

$Z(adj) = Z(obs) + (D(sp)-W(p))/7$

Formula 8-9B $DA = e^{((d*\tan(\theta*\pi/180))/r)}*(r+LTP(elev)+TCH)-r$, where
$d = (r+LTP(elev)*S*\ln((r+Z(obs))/(r+LTP(elev))+D(o)$

Formula 8-10

$D(DA) = (\ln((r+DA)/(r+LTP(elev)+TCH))*(r+LTP(elev)))/\tan(\theta*\pi/180)$

Formula 8-11

$HATh(min) = e^{(((d1+d2)*\tan(\theta*\pi/180))/r)}*(r+LTP(elev)+TCH)-(r+LTP(elev))$, where
$d2 = (V(KIAS)^2*\tan(\alpha/2*\pi/180)/(68625.4*\tan(18*\pi/180))*1852/0.3048$

Formula 8-9A $DA = h+161$

FIG. 8

Formula 10-1 (4-15a)

$FSL = 25.317 \times ((V(KIAS) \times (171233 \times ((288+15) - 0.00198 \times DA)^{0.5}/(288 - 0.00198 \times DA)^{2.628}) + 10)$ Formula 10-2 (4-15b)

$S1 = Z(ext)/CG \times 1852/0.3048$

Formula 10-3 (mine)

$W(p1) = 0.17949 \times D(DA1) + 3645.6$

Formula 10-4 (mine)

$W(s1) = 0.26923 \times D(DA1) + 5468.5$

Formula 10-5 (4-16)

$Z(mas) = DA-h1$

Formula 10-6 (4-17)

$DA(adj) = e^{\wedge}((p \times (S(mas) \times \tan(\theta \pi/180))/(1 + S(mas) \times \tan(\theta \pi/180))/r)) \times r - r$

FIG. 10

RIFLE, COLORADO  GPS RWY 26
RIFLE/GARFIELD COUNTY RGNL (RIL)

Note: Not to scale.

MISSED APPROACH: Climb to 11000 via 248° course to SAWOM WP, then via 274° course to AWRAW WP and hold.

RIFLE, COLORADO

LOC/DME-A
RIFLE/GARFIELD COUNTY RGNL (RIL)

Note: Not to scale.

MISSED APPROACH: Climb to 12000 via RIL VOR/DME R-259 to RIL VOR/DME 4 DME, then climbing right turn direct RIL VOR/DME and hold.

(SQUAT2.SQUAT)                      RIFLE/GARFIELD COUNTY RGNL (RIL)
SQUAT TWO DEPARTURE (RNAV) (OBSTACLE)     RIFLE, COLORADO

Note: Not to scale.

TAKE-OFF MINIMUMS
Rwy 8: NA-ATC.
Rwy 26: Standard with minimum climb of 397' per NM to 9700.

DEPARTURE ROUTE DESCRIPTION

<u>TAKE-OFF RUNWAY 26:</u> Climb to 10500 direct OMJIY, and via 234 track to YIRDU, and via 216 track to SQUAT.

SYSTEM, MODULE, AND METHOD FOR GENERATING PROCEDURE DATA USED IN AN AVIONICS SYSTEM

BACKGROUND OF THE INVENTION

1. Field of the Invention

This invention pertains generally to the field of aviation and the generation of approach and departure procedure data associated with arrival and departure paths into and out of any airport for use in avionics equipment installed in an aircraft.

2. Description of the Related Art

An instrument approach procedure is a type of air navigation that allows a pilot to land an aircraft in reduced visibility commonly referred to as instrument meteorological conditions. Generally, an approach procedure permits a pilot to descend to a decision altitude or minimum descent altitude where a pilot is required to see the runway environment to continue descending towards the runway for landing or discontinue the approach by executing a missed approach. Instrument approach procedures have evolved. Initially, approach procedures have been developed using ground-based navigation facilities. With the advent of a global navigation satellite system ("GNSS") (or satellite navigation system), approach procedures are no longer restricted to navigation fixes or waypoints defined by ground-based facilities. Instead, waypoints can be established using the latitude/longitude coordinate system. With the advent of the GNSS, approach procedures have been created by aviation-governing authorities using waypoints as part of area navigation ("RNAV").

In addition to instrument approach procedure, a departure procedure is a type of air navigation that allows a pilot to take-off an aircraft following a prescribed procedure. A published departure procedure provides flight procedures for an aircraft to follow to ensure either an obstacle-free departure path or to permit the aircraft to follow a defined route required by ATC for air traffic flow management.

The design of approach and departure procedures includes the construction of an obstacle clearance surface ("OCS"). An OCS is constructed to provide the pilot assurance that the approach and departure procedure is free from objects such as obstacles and terrain. With the use of design criteria, an OCS may be constructed and examined for objects penetrating the surface of the OCS. If an object penetrates that OCS, then adjustments will have to be made to the OCS. In an area of mountainous terrain, this could significantly impact the decision altitude or minimum descent altitude to where a pilot may descend the aircraft; also, it could significantly impact the ability for a pilot to take-off from a runway in poor visibility conditions. Current approach and departure procedure design criteria do not provide for remedies which allow the surface of an OCS to be penetrated.

BRIEF SUMMARY OF THE INVENTION

A present novel and non-trivial system, module, and method for generating final approach data, missed approach data, and departure data for use in an avionics system, where the generation of such data allows for the use of a penetrated OCS and possible lower altitudes and/or climb gradients. Approach and departure procedure data that is generated may be provided to at least one avionics system that may include a FMS, display unit system, and/or a vision system. As embodied herein, procedure data may be used, in whole or in part, as a basis for forming a flight route corridor image on a display unit, where the display of a flight route corridor includes the display of objects such as terrain and obstacles that penetrate an obstacle clearance surface or objects that may not meet a minimum obstacle clearance distance. A system, module, and/or method for constructing a flight route corridor image is described in a U.S. patent application Ser. No. 12/283,400 entitled "System, Module, and Method for Generating an Image of a Flight Route Corridor on a Display Unit," which is incorporated by reference in its entirety.

In one embodiment, a system is disclosed for generating departure and approach data for use in an avionics system. The system comprises a source of navigation data, a source of object data where an object may be terrain and/or obstacles, a processor, and an avionics system to receive the generated approach data. After receiving the navigation data and object data, an approach or departure path may be defined by the processor; as embodied herein, the path may include a glide path of a final approach procedure and/or a climb path of a missed approach path or departure path. Then, an obstacle clearance surface ("OCS") may be constructed and examined for object penetration using design criteria appropriate for the procedure. If penetration is found to exist, the OCS may be adjusted if there is no remedy which will allow for the use of the penetrated OCS. Then, procedure data is generated and provided to at least one avionics system that may include a FMS, display unit system, and/or a vision system. For approach procedures, decision altitude data is determined and included in the generation of procedure data.

As embodied herein, remedies may include the use of minimum obstacle clearance criteria, an iterative process, a path construction function, an existing departure procedure, and the use of input factors to determine a real-time estimated climb performance which could affect the climb gradient of a missed approach path.

In another embodiment, a module is disclosed for generating approach and departure data for use in an avionics system. The module comprises an input communications interface, a processor, and an output communications interface. The input communications interface facilitates the receipt of data, and the output communications interface facilitates the providing of data. As discussed above, the processor may receive navigation data and object data; define an approach or departure path; and construct, examine, and adjust an OCS if no remedy exists to allow the use of a penetrated OCS. As embodied herein, the approach path may be associated with a final approach procedure or a missed approach procedure, and a departure path may be associated with a departure procedure. As further embodied herein, the processor may determine the applicability of the remedies discussed above for a penetrated OCS. Then, the processor may generate approach or departure procedure data, whereby such data is provided through the output communications interface to at least one avionics system. For approach procedures, decision altitude data is determined and included in the generation of procedure data, the processor may also determine applicable decision altitude data.

In another embodiment, a method is disclosed for generating approach and departure data for use in an avionics system. The method comprises receiving navigation data and object data; defining a flight path; and constructing an OCS, and adjusting an OCS if no remedy exists to allow the use of a penetrated OCS. Then, the method comprises generating of approach or departure procedure data and providing the approach or departure procedure data to at least one avionics system. For approach paths, the method includes determining of applicable decision altitude data. As embodied herein, the approach path may be associated with a final approach procedure or a missed approach procedure, and remedies exist to address the allowable use of a penetrated OCS.

The drawings of FIG. 2 depict some of the reference points and definitions associated with the design of approach procedures.

The drawings of FIG. 3 illustrate a final approach OCS associated with an LPV procedure.

The drawings of FIG. 4 provide formulas associated with a LPV final approach OCS.

Figure 5:
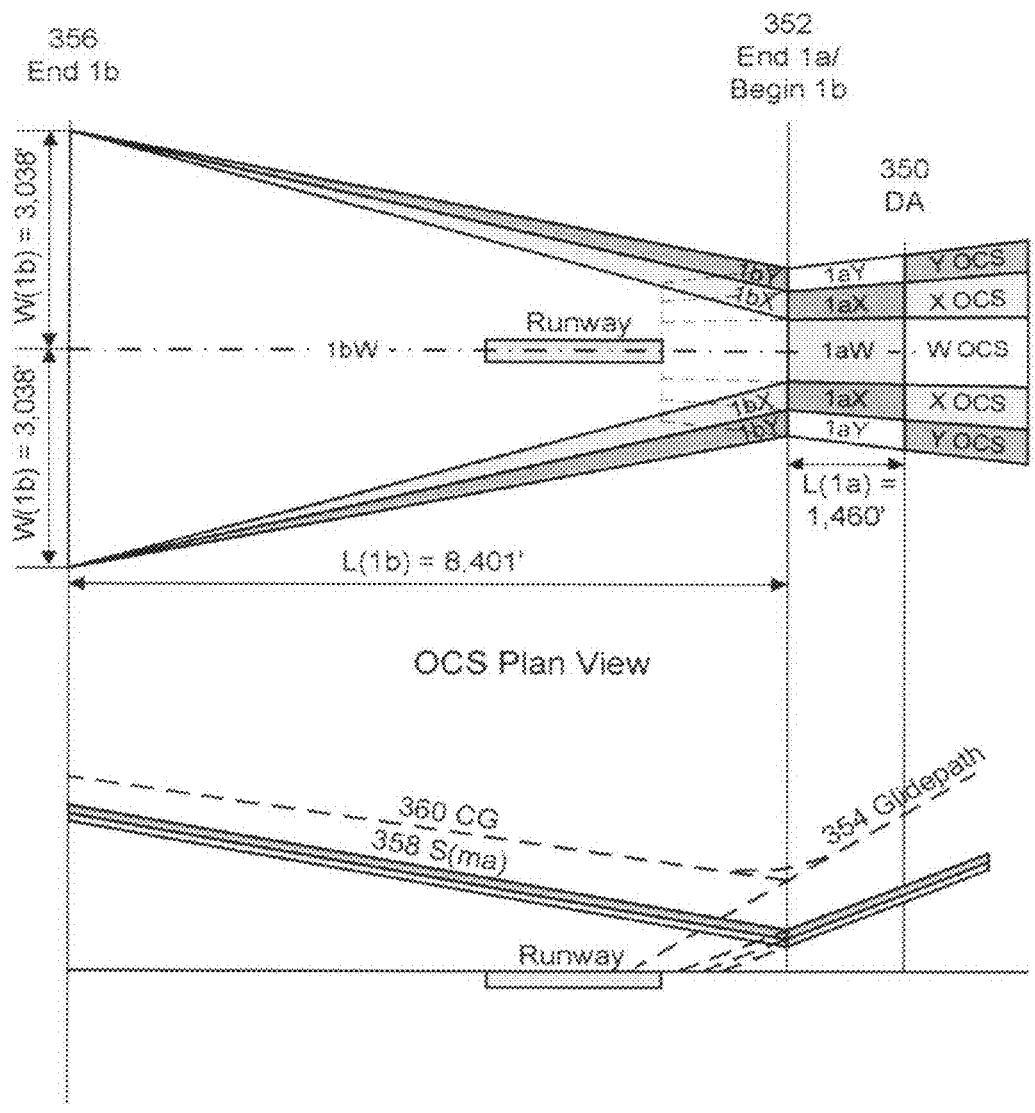

FIG. 5 illustrates a missed approach OCS associated with an LPV approach.

FIG. 6 provides formulas associated with an LPV missed approach OCS.

The drawings of FIG. 7 illustrate a final approach OCS associated with an LNAV/VNAV procedure.

FIG. 8 provides formulas associated with an LNAV/VNAV final approach OCS.

Figure 9:
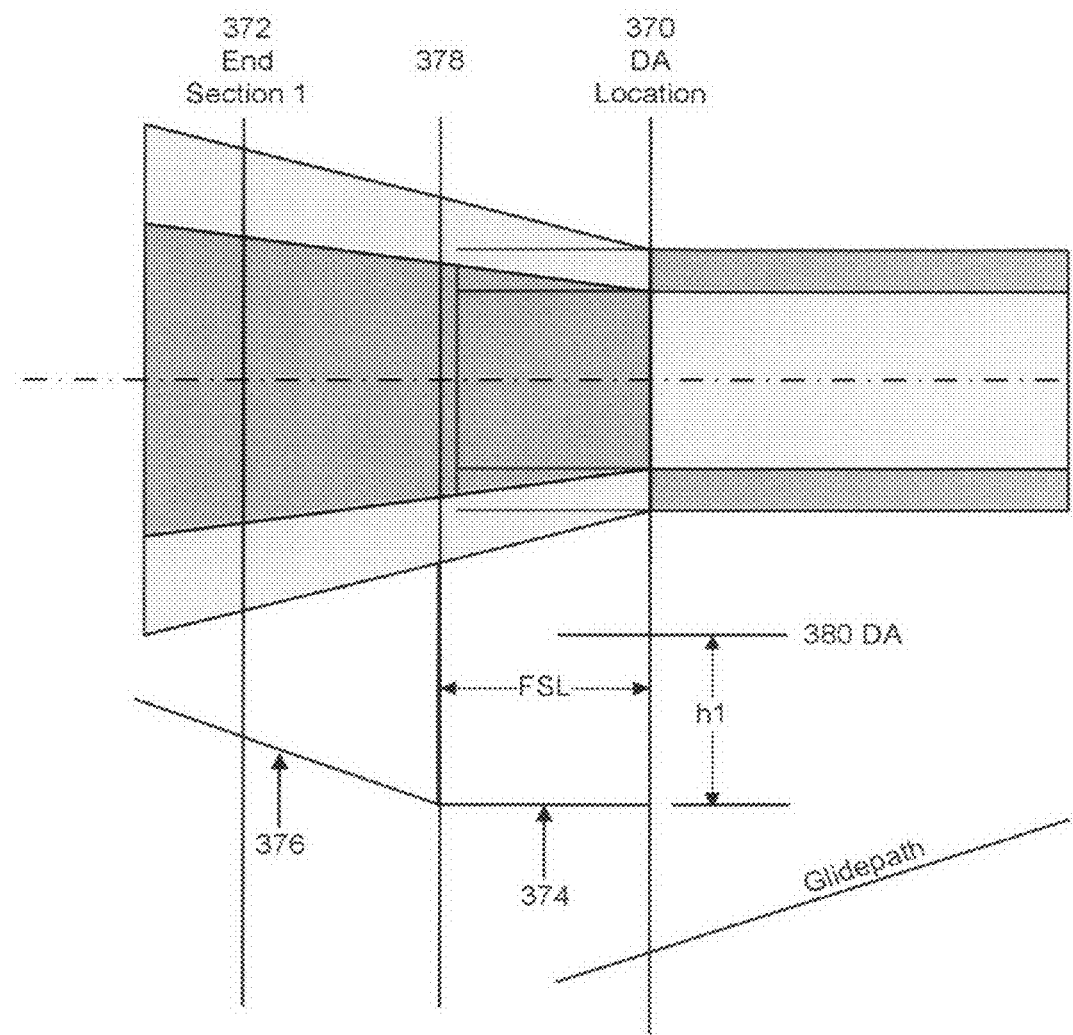

The drawings of FIG. 9 illustrate a missed approach OCS associated with an LNAV/VNAV approach.

FIG. 10 provides formulas associated with an LNAV/VNAV missed approach OCS.

Figure 11:
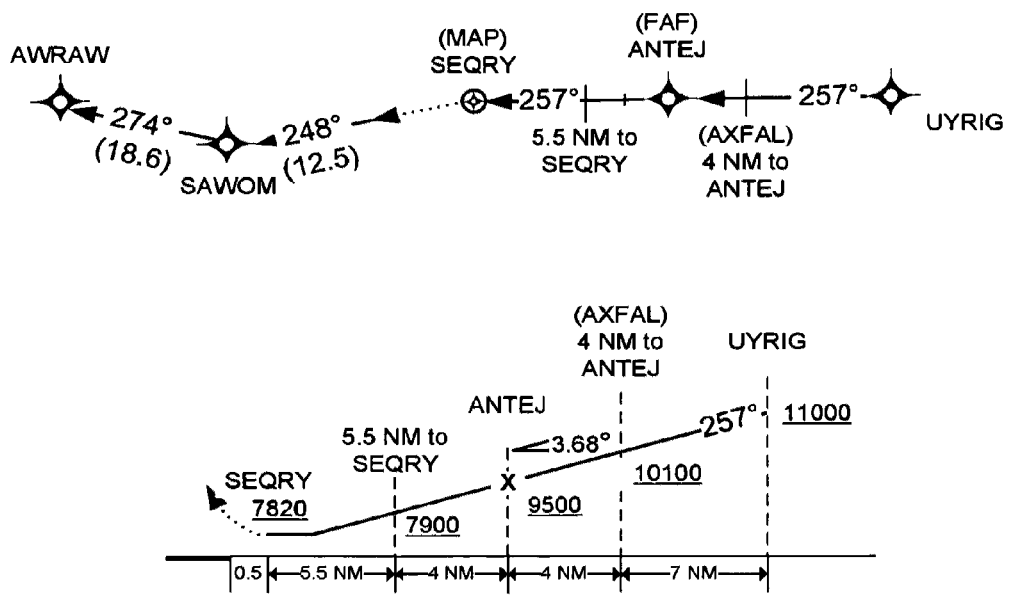

FIG. 11 illustrates a published approach procedure.

Figure 12:
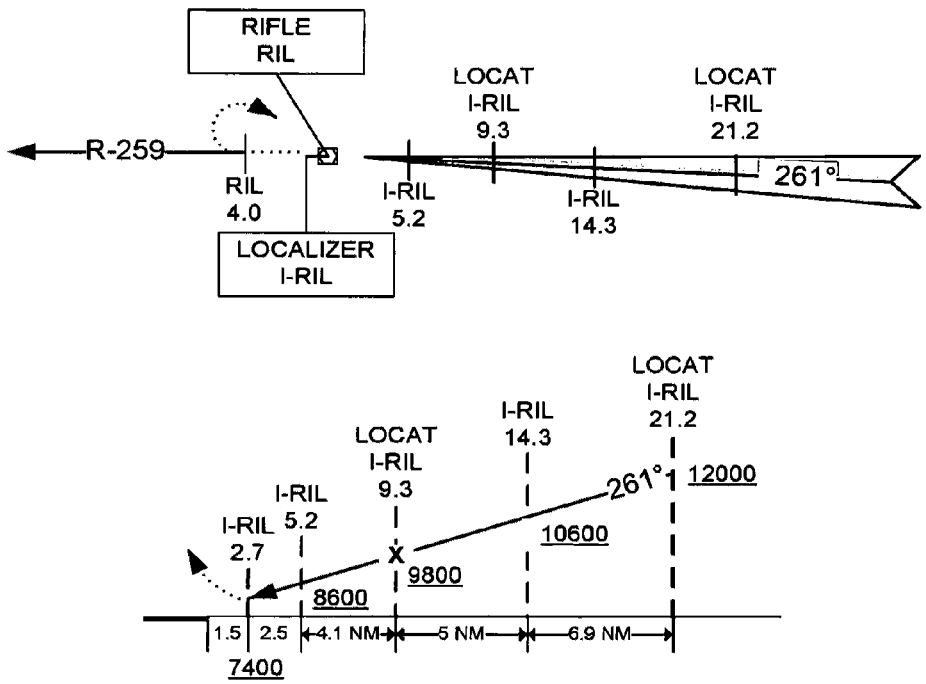

FIG. 12 illustrates a second published approach procedure.

Figure 13:
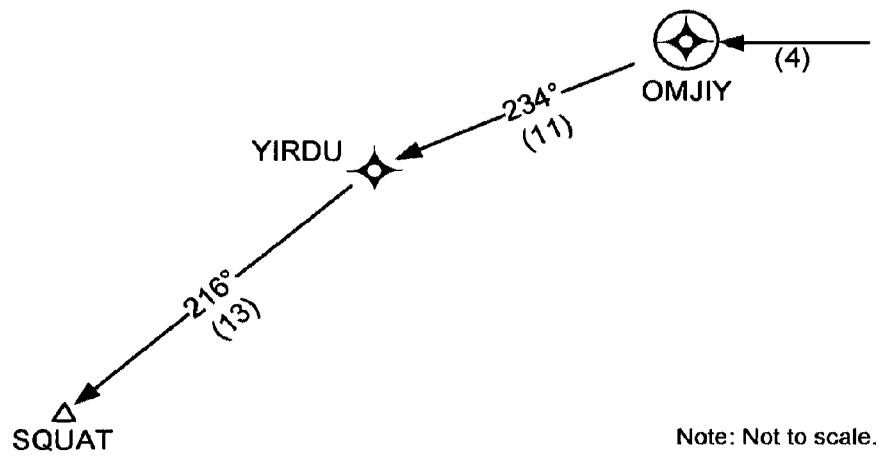

FIG. 13 illustrates a published obstacle departure procedure.

Figure 14:
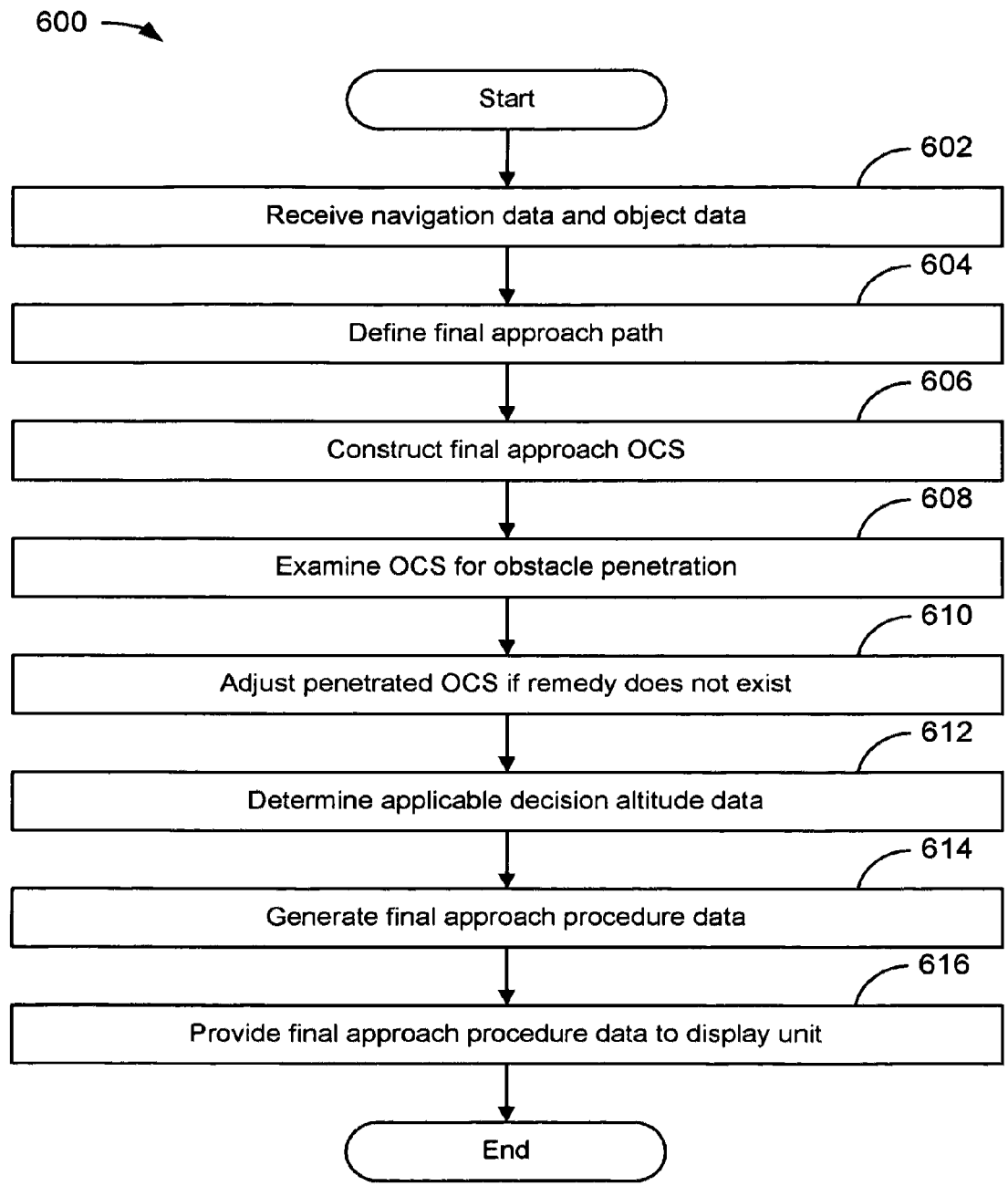

FIG. 14 depicts a flowchart of a method for generating final approach data for use in an avionics system.

Figure 15:
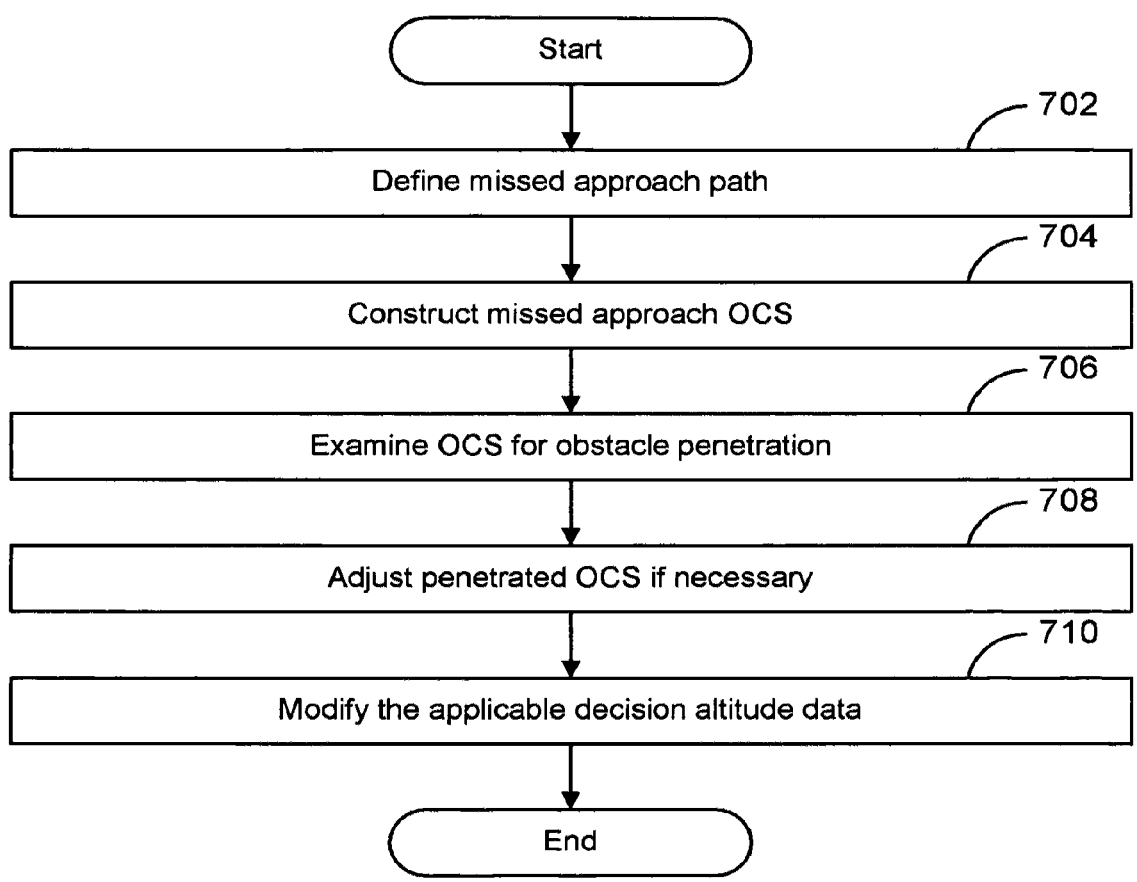

FIG. 15 depicts a flowchart of a method for generating missed approach data for use in an avionics system.

Figure 16:
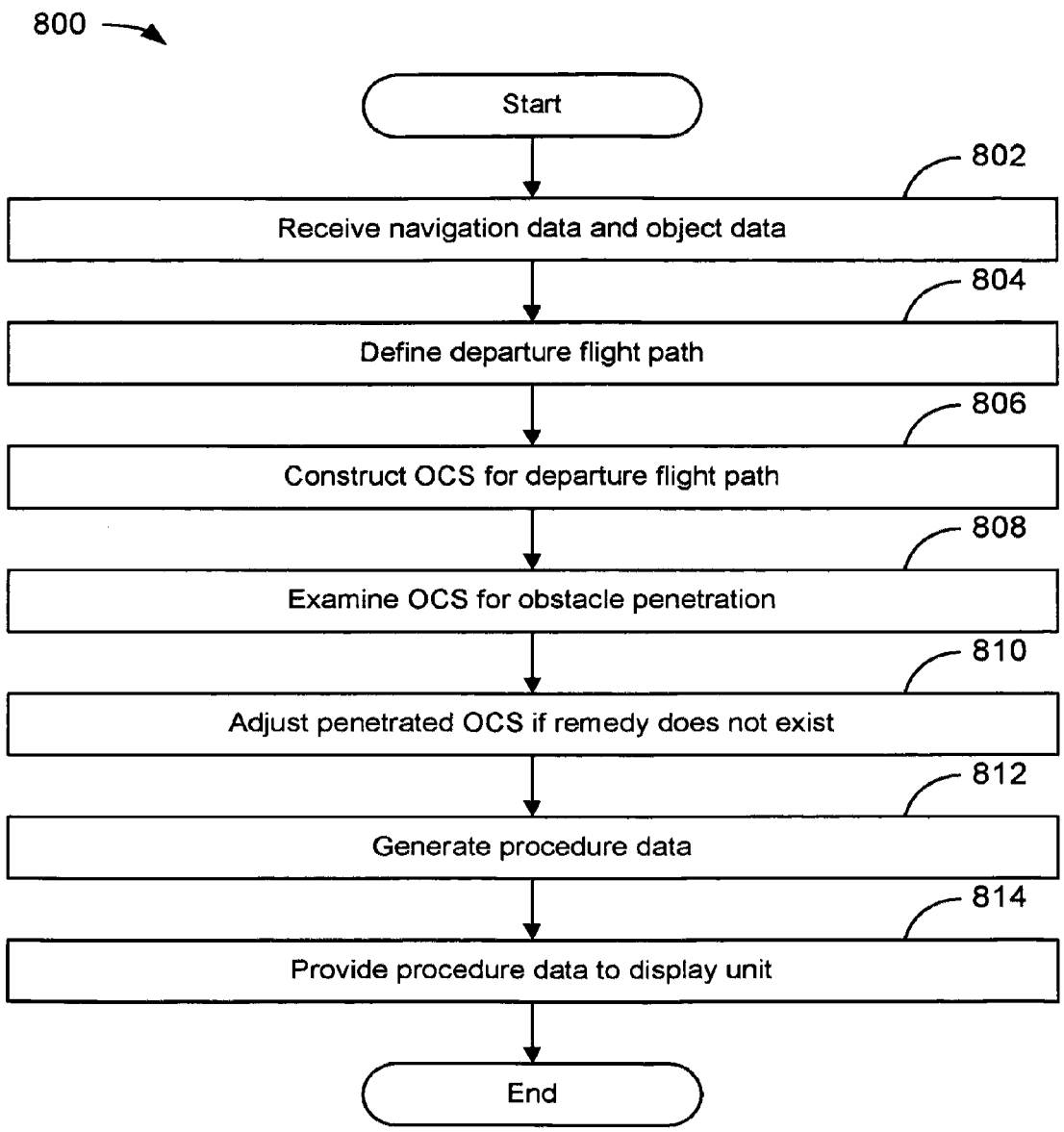

FIG. 16 depicts a flowchart of a method for generating departure data for use in an avionics system.

DETAILED DESCRIPTION OF THE INVENTION

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
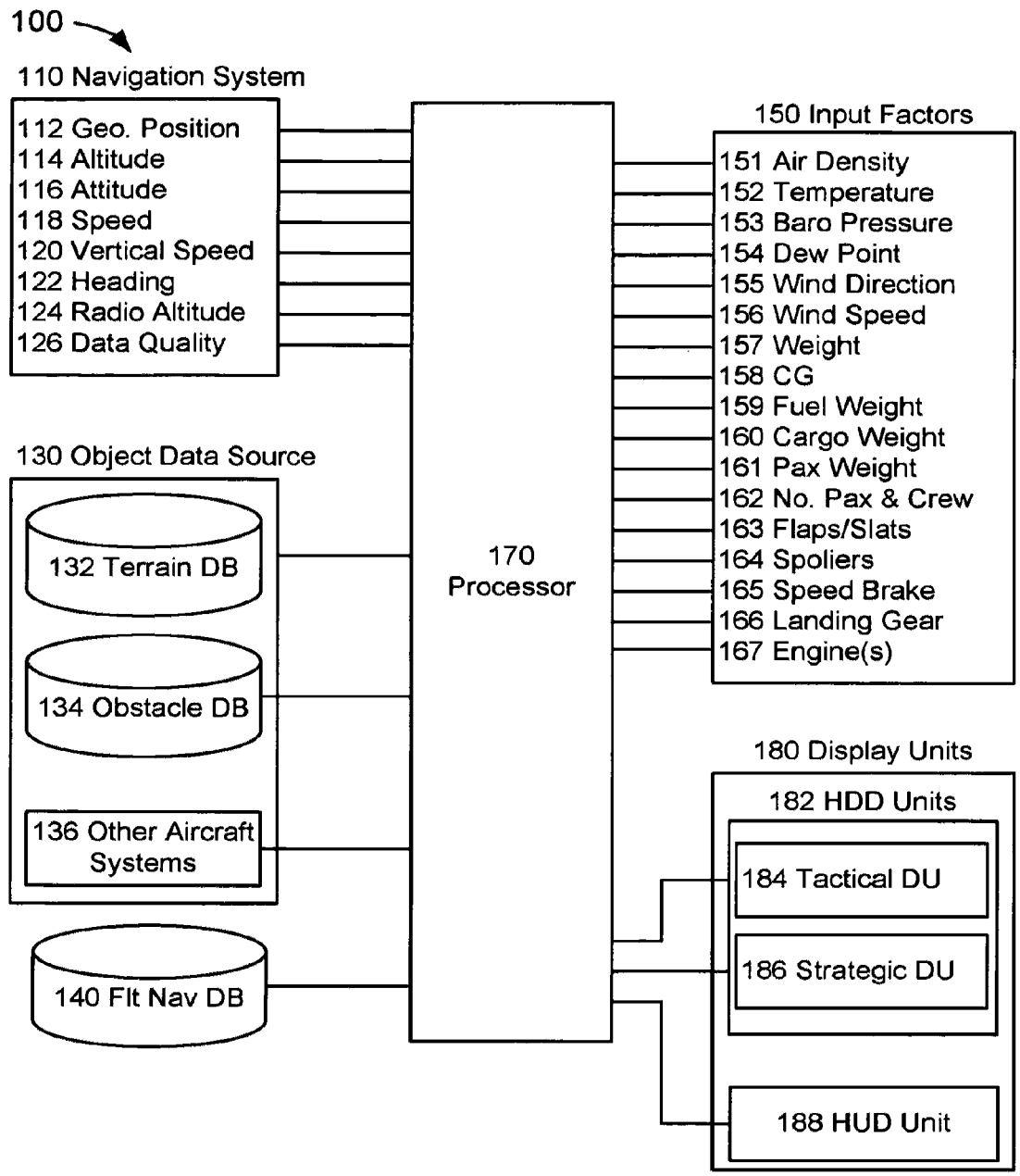
FIG. 1 depicts a block diagram of a system for generating approach and departure data for use in an avionics system.

FIG. 1 depicts a block diagram of an aircraft procedure generation system 100 suitable for implementation of the techniques described herein. The aircraft procedure generation system 100 of an embodiment of FIG. 1 may include navigation system 110, object data source 130, flight navigation database 140, input factors 150, a processor 170, and display units 180.

In an embodiment of FIG. 1, a navigation system 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system ("GNSS") (or satellite navigation system), and a flight management system ("FMS"), all of which are known to those skilled in the art. For the purposes of the embodiments herein, a radio altimeter system may be included in the navigation system 110; a radio altimeter system is known to those skilled in the art for determining the altitude above the surface over which the aircraft is currently operating. As embodied herein, a navigation system 110 could provide navigation information including, but not limited to, geographic position 112, altitude 114, attitude 116, speed 118, vertical speed 120, heading 122, radio altitude 124, and data quality 128 to a processor 170 for subsequent processing as discussed herein.

Navigation data quality 128 may include, but is not limited to, accuracy, uncertainty, integrity, and validity for data provided by a navigation system 110. As embodied herein, aircraft position comprises geographic position (e.g., latitude and longitude coordinates) and altitude, and direction may be derived from either geographic position, aircraft position, or both. As embodied herein, aircraft orientation may include pitch, roll, and/or yaw information related to the attitude of the aircraft.

In an embodiment of FIG. 1, an object data source 130 may include, but is not limited to, a terrain database 132, obstacle database 134, and other aircraft systems 136, or any combination thereof. As embodied herein, object data may include terrain data, obstacle data, or both. An object data source 130 could comprise any source of terrain data, obstacle data, other manmade or natural features, geopolitical boundaries, or any combination thereof. Obstacles may include, but are not limited to, towers, buildings, poles, wires, other manmade structures, and foliage.

A terrain database 132 may be any database used to store terrain data contained in digital elevation models ("DEM"). Generally, the terrain data of a DEM is stored as grids composed of cells, and each grid or cell represents an area of terrain. A grid or cell may be of various shapes. For example, a grid or cell may be defined in arc-seconds of latitude and longitude, or may be rectangular, square, hexagonal, or circular. A grid or cell may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with the GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 132, obstacle database 134, and navigation database 140 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle could be stored in an obstacle database 134, and a temporary runway closure could be stored in a navigation database 140. Any database used in the embodiments disclosed herein may be a stand-alone database or a combination of databases. For example, a terrain database 132 may be associated with a terrain awareness and warning system ("TAWS") only. In an alternative embodiment, terrain data could be stored in or combined with an airport database, airspace database, or with a database used by any other aircraft system including, but not limited to, an FMS, or an airspace awareness and warning system ("AAWS").

Although other aircraft systems 136 could employ terrain databases 132, such systems could also be a source of terrain data provided to a processor 170. For example, a synthetic vision system ("SVS") may employ a terrain database and/or obstacle database to generate terrain image data. Here, the terrain database and/or obstacle database that is part of an SVS could be the source of object data. Alternatively, the SVS could provide a processor 170 with terrain data in the form of terrain image data.

In another alternative, non-database terrain and/or obstacle acquisition system. For example, a radar-based TAWS system could provide real-time terrain and/or obstacle data which could be employed, like any other data source, in the real-time generation of approach and departure procedure data. Moreover, a non-database source of object data could be used to as a second source of such data that may be used in conjunction with or used as a source of redundant information that may be provided along with data stored in a database. Other examples of other aircraft systems 136 which could comprise sources of terrain data include, but are not limited to, an AAWS. As embodied herein, a terrain database 132, an obstacle database 134, and/or other aircraft systems 136 could provide data representative of objects to a processor 170 for subsequent processing as discussed herein.

A navigation database 140 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, GNSS Landing Systems. Such navigation database 140 could be provided by an aircraft system such as, but not limited to, an FMS, a system known to those skilled in the art.

Data contained in a navigation database 140 could be used in the construction of approach and departure procedures as disclosed herein. Generally, an aviation regulatory authority or organization possesses the authority of designing and designating instrument approach and departure procedures. In the United States, the Federal Aviation Administration ("FAA") establishes and provides definitions and ascertainable dimensions of instrument approach and departure procedures. For instance, FAA Order 8260.3B entitled "United States Standard for Terminal Instrument Procedures (TERPS)" dated May 15, 2002 provides criteria used to formulate, review, approve, and publish procedures for instrument approach and departure of aircraft to and from civil and military airports. Also, FAA Order 8260.54A entitled "The United States Standard for Area Navigation (RNAV)" provides criteria for obstacle clearance evaluation of RNAV approach procedures, e.g., Localizer Performance with Vertical Navigation ("LPV"), Lateral Navigation ("LNAV"), Lateral Navigation/Vertical Navigation ("LNAV/VNAV"), and Localizer Performance ("LP"). The criteria in FAA Order 8260.54A support adding an instrument approach system (ILS) line of minimum to an RNAV (GPS) approach procedure using LPV construction criteria at runways served by an instrument landing system. At the time of this writing, both Orders may be obtained on the Internet at http://www-.faa.gov/about/office_org/headquarters_offices/avs/offices/afs/afs400/afs420/policies_guidance/orders/.

The discussion herein may be drawn to these FAA standards for the purpose of simplifying the illustration and discussion only; however, the embodiments are neither limited nor restricted to the design and designation criteria of instrument approach or departure procedures employed in the United States or those with governing oversight of the FAA. It is known to those skilled in the art that aviation governing authorities throughout the world may develop or may have developed criteria unique to their respective jurisdictions which may or may not employ similar instrument approach or departure procedure criteria, and end users of navigational data could develop criteria directed to unique operational requirements that may or may not require special equipment or authorization. The embodiments disclosed herein could include any procedure developed from at least one ascertainable fix and obstacle clearance evaluation criteria.

The drawings of FIG. 2 depict some of the reference points and definitions associated with a runway 202 that may be employed by the FAA as approach construction criteria used in the design of instrument approach procedures. It should be noted that although the detailed discussion herein will be drawn towards final and missed approach procedures, those skilled in the art understand that other reference points and definitions associated with a runway may be employed by the FAA as departure construction criteria used in the design of departure procedures. The embodiments herein include any procedure that may use reference points and definitions employed as construction criteria.

Data representative of these points and definitions for one or more runways could be contained in a navigation database 140. A runway Landing Threshold Point ("LTP") 204 (which could also be called a runway threshold point) may be a three dimensional point at an intersection of the runway centerline 206 and the runway threshold ("RWT") 208; the direction of a runway centerline 206 from an LTP 204 may be measured in reference to magnetic north using a magnetic bearing. In one embodiment, an LTP 204 could be defined using latitude, longitude, and elevation derived from government sources. In another embodiment, a geoid height could be included in definition, where a geoid could be considered to be an equipotential surface that is everywhere normal to the direction of gravity and would coincide with the mean ocean surface of the Earth, if the oceans were in equilibrium, at rest, and extended through the continents. The surface of a geoid may be approximated using a mathematically-defined reference ellipsoid employed in a geodetic system. The height of a geoid ("GH") may be measured relative to the ellipsoid, and it may be positive if it is above the reference ellipsoid and negative if it is below.

Geodetics or geodesy is a scientific discipline dealing with the measurement and representation of the Earth. An example of a geodetic system, provided for the purpose of illustration and not limitation, is a World Geodetic System ("WGS"). A WGS could be used, for example, in a GNSS to provide a frame of reference or coordinate system of the Earth. WGS's have evolved with past refinements made possible due to additional global data from precise and accurate measurements and will likely further evolve with future refinements. Those skilled in the art can appreciate the adaptability of future refinements of the WGS or any other geodetic system to the embodiments disclosed.

A glidepath angle ("GPA") 210 may be the angle of a specified final approach descent path 212 (or glidepath) to be flown by an aircraft 214 relative to an Approach Surface Base Line ("ASBL") 216 at the RWT 208, where the ASBL 216 may be considered as a horizontal line tangent to the Earth. A Threshold Crossing Height ("TCH") 218 may be the height of the GPA 210 above the LTP 204. A Flight Path Control Point ("FPCP") 220 may be an imaginary point above the LTP 204 at the TCH 218 from which the glidepath mathematically emanates.

Figure 2A:
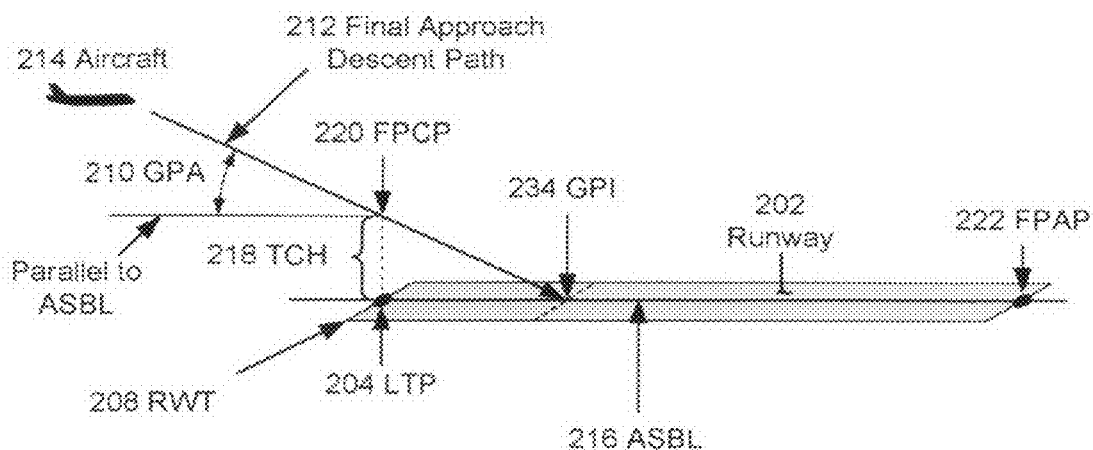
Figure 2B:
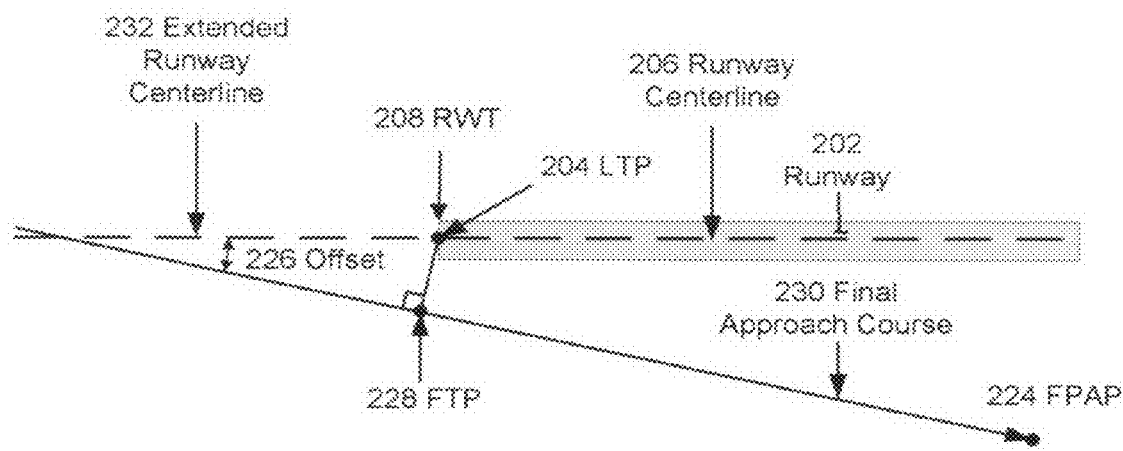

A Flight Path Alignment Point ("FPAP") 222 or 224 may be a three-dimensional point used in conjunction with a LTP 204 and the geometric center of a WGS reference ellipsoid to define a vertical plane containing a final approach course of a final approach descent path 212. As shown in FIG. 2A, an FPAP 222 could be located at the departure end of the runway 202 that is opposite of the RWT 208, or it could be located at a different location. As shown in FIG. 2B, an FPAP 224 and a final approach course 212 may be offset from a runway centerline 206, and where such offset exists, a Fictitious Threshold Point ("FTP") 228 could be used as an equivalent of a LTP 204, where the FTP 228 may be located at an intersection of a final approach course 212 and a line perpendicular to it passing through the LTP 204; the elevation of an FTP 228 could be the same as an LTP 204, and a FPCP may be an imaginary point above the FTP 228 at the TCH from which the glidepath mathematically emanates. The angle of offset 226 may be the angle formed between a final approach course 230 and an extended runway centerline 232 having the same direction or magnetic bearing as runway centerline 206. A Ground Point of Intercept ("GPI") 234 may be a point in the vertical plane where the final approach descent path 212 intercepts the ASBL 216.

Data representative of the points and definitions depicted in the drawings of FIG. 2 and associated with one or more runways could be contained in a navigation database 140. Some or all of the reference points and definitions could be used as approach construction criteria in the design of instrument approach procedures including criteria specified for obstacle clearance evaluation of Area Navigation ("RNAV") approach procedures including, but not limited to, Localizer Performance with Vertical Guidance ("LPV"), Lateral Navigation/Vertical Navigation ("LNAV/VNAV"), Localizer Performance ("LP"), and Lateral Navigation ("LNAV"). Typically, LPV and LNAV/VNAV approach procedures provide vertically guided procedures, and LP and LNAV approach procedures provide non-vertically guided procedures. The application of approach construction criteria to LPV and LNAV/VNAV approach procedures will be discussed in detail below, and even though the remaining discussion herein will be drawn to the LPV and LNAV/VNAV approach procedures, the embodiments herein could be applied to other construction criteria of other approach procedures including, but not limited to, the LP and LNAV approach procedures.

Returning to FIG. 1, input factors 150 are determining factors which may be used to determine one or more climb gradients based upon climb performance as disclosed in detail below. Input factors 150 may be provided by a plurality of aircraft systems or components thereof. Input factors 150 could include real-time system or sensor data, signal input from a plurality of aircraft systems or sensors, and information from any database or source. As embodied herein, an input factor 150 could provide data or a signal of any form containing information that may be provided to and received by a processor 170.

As embodied herein, input factors 150 could include those inputs defined above as being part of the navigation system 110 (e.g., geographic position 112, altitude 114, attitude 116, speed 118, vertical speed 120, heading 122, radio altitude 124, and navigation data quality 126). Moreover, any input provided by a navigation system 110 could be considered an input factor for the purposes of the embodiments herein. In other words, a navigation system 110 may be considered as providing a subset of input factors 150. The presentation of the specific inputs from navigation system 110 should not be construed as an exclusion or limitation to input factors 150. As embodied herein, input factors 150 may include information from any data or information source available to a processor 170 including, but not limited to, an object data source 130 and a runway data source 140. In other words, an object data source 130 and a runway data source 140 may be considered as sources providing a subset of input factors 150. The presentation of an object data source and a runway data source as separate item numbers 130 and 140 should not be construed as an exclusion or limitation to input factors 150.

In an embodiment herein, input factors 150 may be selected by a manufacturer or end user as a determining factor for one or more climb criteria used in an equation that could define climb performance. Climb performance may be defined by an equation containing one or more selected climb criteria, each of which may be comprised of one or more input factors 150.

In another embodiment herein, input factors 150 may be selected by a manufacturer or end user for one or more climb criteria used in an equation that could define climb performance to determine climb gradient. As embodied herein, climb performance could provide the basis for determining a climb gradient. A climb gradient may be defined by at least one equation containing one or more selected climb criteria.

When included in an equation, data representative of input factors 150 may be acquired by or through aircraft systems and sensors as discussed above and provided as input to a processor 170. When received, the processor 170 may process the data in accordance with a climb performance algorithm that could contain the equation or equations defining a climb performance. As a result, the processor 170 may determine a climb gradient based upon the application of the real-time dynamic or static input factors 150.

One or more climb performances may be defined using one or more selected climb criteria, each of which may be dependent on one or more input factors 150. The application of such climb criteria and input factors 150 by a processor 170 may determine a climb gradient and/or climb distance representative of real-time predictable and achievable aircraft performance using input factors 150. Although a manufacturer or end user may define a climb performance using one climb criterion such as an aircraft's maximum gross weight (as will be discussed below in detail) that may be independent of input factors 150, the advantages and benefits of the embodiments herein exploit the ability of a processor 170 to receive a plurality of available input factors 150, apply them to a climb performance defined and contained in an algorithm, and determine a climb gradient and/or climb distance unique to actual conditions of flight operations as measured by the values of the input factors 150.

To provide a simple example of how input factors 150 may be used in the embodiments herein, suppose a climb performance comprises meteorological or environmental criteria such as pressure altitude, temperature, wind, and weight. Those skilled in the art understand that a climb gradient may be affected by a plurality of factors including, but not limited to, pressure altitude, temperature, humidity, wind, and weight. Here, determining factors representing altitude 114, temperature 152, barometric pressure 153, dew point 154, wind direction 155, wind speed 156, and current weight 157 may be provided as input factors 150 to processor 170 for subsequent processing in accordance with the climb criteria that defines the climb performance. A processor 170 is able to define a climb gradient that is real-time because it is based upon input factors 150.

In the following paragraphs, other examples of climb criteria and performance factors are provided to illustrate the ability with which a manufacturer or end user may define a climb gradient as embodied herein. These illustrations are intended to provide exemplary climb criteria and performance factors that may be used in a procedure generation system 100, and are not intended to provide a limitation to the embodiments discussed herein in any way, shape, or form.

As noted above, input factors 150 may include some of those inputs provided to a processor 170 by a navigation system 110, even though they are not enumerated under item 150 of FIG. 1; input factors that could affect the performance of the aircraft may include some inputs that are provided by any aircraft system other than a navigation system 110. As embodied herein, one or more input factors 150 could be included in the computation of another input factor. For instance, wind direction 155 and wind speed 156 have been considered in a computation of speed 118, and barometric pressure 153 could have been considered in a computation of altitude 114. In such instances, a processor 170 may be programmed to accept only one of these factors.

In another example, a climb performance could include weight and balance climb criteria. If so, input factors 150 could include, but are not limited to, data representative of aircraft empty weight 157, center of gravity ("CG") 158, weight of fuel 159, weight of cargo 160, weight of passengers 161, and number of passengers and crew 162 (for which a standard weight can be applied). In another example, a climb performance could include aircraft climb configuration and system climb criteria. If so, input factors 150 could include, but are not limited to, data representative of an aircraft's flaps and slats 163, spoilers 164, speed brake 165, and landing gear 166 configurations. In another example, a climb performance could include engine performance climb criteria. If so, input factors 150 could include, but are not limited to, data representative of engine performance or status 167 or available thrust. In another example, the determination of climb performance could include an assumption that one engine of a multi-engine aircraft is inoperative.

A processor 170 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A processor 170 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, a processor 170 could be a processor(s) used by or in conjunction with any other system of the aircraft including, but not limited to, a processor(s) associated with a navigation system, an FMS, a TAWS, a vision system, or any combination thereof.

A processor 170 may receive as input data representative of information obtained from various systems and/or sources including, but not limited to, navigation system 110, object data source 130, a flight navigation database 140, and input factors 150. A processor 170 may be electronically coupled to systems and/or sources to facilitate the receipt of input data; as embodied herein, operatively coupled may be considered as interchangeable with electronically coupled. A processor 170 may provide output data to various systems and/or units including, but not limited to, display units 180, and a crew alerting system 190. A processor 170 may be electronically coupled to systems and/or units to facilitate the providing of output data representative of a procedure. It is not necessary that a direct connection be made; instead, such receipt of input data and the providing of output data could be provided through a data bus or through a wireless network.

Display units 180 may include, but are not limited to, HDD units 182 units and HUD 188 units. As embodied herein, a display unit which may display approach or departure information. Display units 180 may display image from data produced by one or more vision systems such as, but not limited to, an SVS, an enhanced vision system ("EVS"), or a combined SVS-EVS. HDD units 182 are typically units mounted to an aircraft's flight instrument panel located in front of a pilot and below the windshield and the pilot's field of vision. As embodied herein, tactical flight information displayed on a tactical display unit 184 could be information relevant to the instant or immediate control of the aircraft, whether the aircraft is in flight or on the ground. A tactical display unit 184 could display the same information found on a primary flight display ("PFD"), such as "basic T" information (i.e., airspeed, attitude, altitude, and heading). Although it may provide the same information as that of a PFD, tactical display unit 164 may also display a plurality of indications or information including, but not limited to, flight route, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A tactical display unit 164 is designed to provide flexible configurations which may be tailored to the desired configuration specified by a buyer or user of the aircraft.

As embodied herein, a tactical unit display 164 may display an image of a flight route corridor, where a flight route could be the same as a flight path as discussed herein including, but not limited to, a glidepath and/or climb path. The display of a flight route corridor could include the display of one or more objects penetrating an obstacle clearance surface or objects that would not meet a minimum obstacle clearance distance, both of which are discussed below in detail. Approach or departure procedure data generated by the embodiments disclosed herein could be used, in part or in whole, in the generation of a flight route corridor image. A system, module, and/or method for constructing an flight route corridor image is described in a U.S. patent application Ser. No. 12/283,400 entitled "System, Module, and Method for Generating an Image of a Flight Route Corridor on a Display Unit," which is incorporated by reference in its entirety.

A strategic display unit 186 could be a unit which presents information to the crew relative to the intended future state(s) of the aircraft (e.g. intended location in space at specified times) along with information providing contextual information to the crew (e.g. terrain, navigation aids, geopolitical boundaries, airspace boundaries, etc.) about such state(s). One example of such display unit is commonly referred to as a Navigation Display. In some configurations, the strategic display unit could be part of an Electronic Flight Information System ("EFIS"). On these systems, terrain information may be displayed simultaneously with information of other systems. In one embodiment herein, terrain information may be displayed simultaneously with weather information with no loss or a negligible loss of displayed information.

As embodied herein, display units 180 may include a vision system (not shown) which generates an image data set which represents the image displayed on a display unit. Vision systems include, but are not limited to, SVS, EVS, combined SVS-EVS, or combination thereof. As embodied herein, approach procedure or departure data could be included, in part or in whole, in the generation of an image data set. As embodied herein, the image represented the image data set could include an image of a flight route corridor.

It should be noted that the following disclosure will discuss in detail the construction of approach procedures and provide examples demonstrating the application of procedure design criteria to construct obstacle clearance surfaces and examine them for object penetration. Although the discussion will be drawn to the final and missed approach procedures of two types of procedures developed by the FAA (the LPV and LNAV/VNAV procedures), the embodiments herein are not limited to approach procedures. The embodiments herein include departure procedures associated with a flight path from which an obstacle clearance surface may be constructed and examined for object penetration.

Figure 3A:
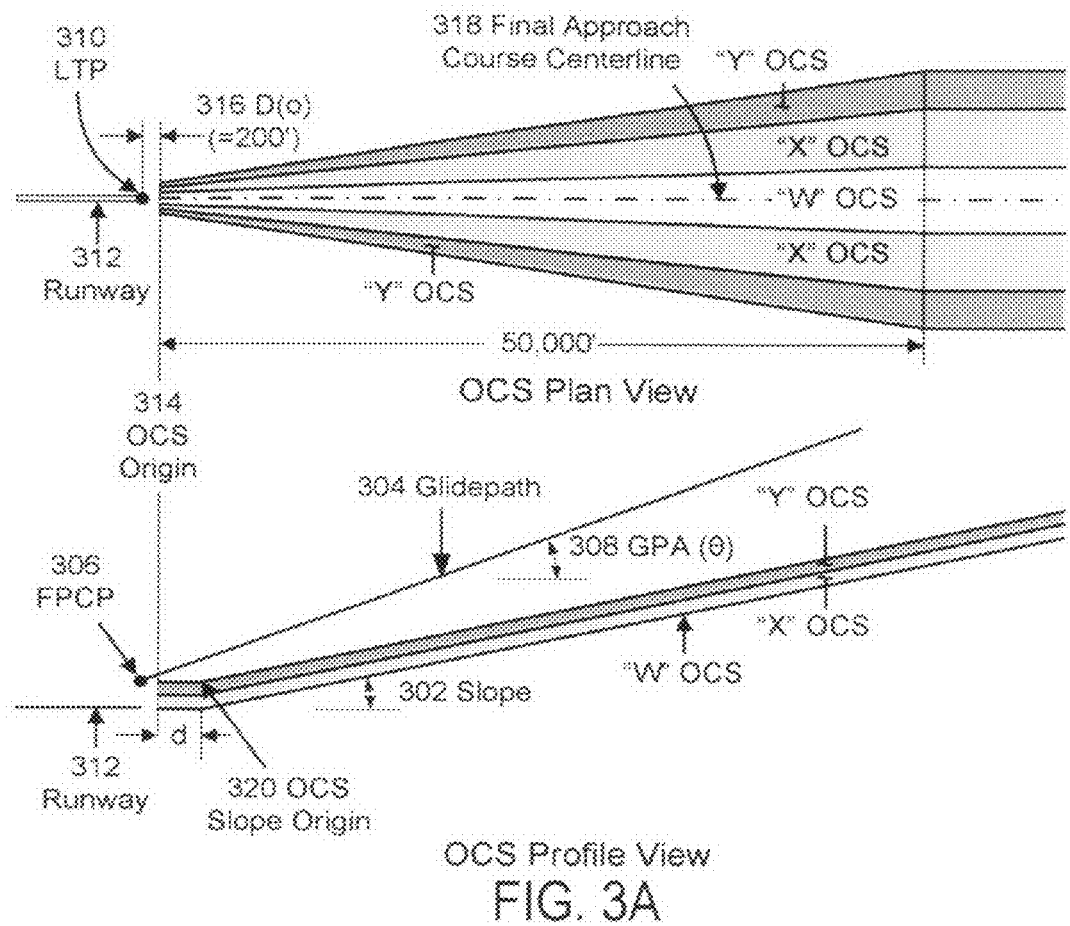

The drawings of FIG. 3 illustrate an obstacle clearance surface ("OCS") that could be applicable to a final approach segment of a precision final approach or an LPV approach (not drawn to scale). FIG. 3A presents a plan view and profile view of an OCS having a slope 302 and located below a glidepath 304 extending from an FPCP 306 and having a GPA 308 measured in terms of θ; as stated above, an FPCP may be an imaginary point above the LTP 310 (or an FTP) at the TCH from which the glidepath mathematically emanates. As shown by formula 4-1 in FIG. 4A, slope S may be measured as run over rise and may be determined using approach design criteria.

Generally, an OCS may be an upward or downward sloping surface used for object evaluation where the flight path is climbing or descending and may be comprised of more than one surface; as shown in the drawings of FIG. 3, an OCS may be comprised of a plurality of surfaces: a W surface ("W OCS"), an X surface ("X OCS"), and a Y surface ("Y OCS"). The separation between the OCS and a vertical path angle such as GPA 308 defines the minimum object clearance ("ROC") required for any given point. An OCS may be primarily comprised of primary surfaces W OCS and X OCS, and a transitional surface Y OCS.

The origination of an OCS may be determined using a point of reference. As embodied in FIG. 3A, an LTP 310 of a runway 312 (or FTP if applicable) could serve as a reference point from which the origin or beginning of an OCS, i.e., the OCS origin 314, may be determined. An OCS origin 314 may be defined as being a fixed distance D(o) 316 from an LTP 310. As depicted in FIG. 3A, the OCS could begin at D(o) =200' from the LTP 310 measured along the final approach course centerline 318 and could extend to a second position located at a fixed distance from an OCS origin 314. As depicted in FIG. 3A, the second position is located at the fixed distance of 50,000 feet from the OCS origin 314. Alternatively, the second position could be a Precision Final Approach Fix ("PFAF") (not shown) located at a distance D(PFAF) and determined using elevation LTP(elev) of the LTP 310 and the radius r of the Earth could serve as a reference datum in approach design criteria. As shown by formula 4-2 in FIG. 4A, D(PFAF) may be determined as a function of the LTP(elev), r, θ, TCH, and alt(min), a minimum intermediate segment altitude that may be determined using approach design criteria.

The origination of an OCS slope 320 could begin at an OCS origin 314, or as depicted in FIG. 3A, at another position located a distance "d" from the OCS origin 314. OCS slope origin 320 may be pushed back or away from the LTP 310 a distance "d" from the OCS origin 314 if, for example, a GPI and the RWT are relatively near each other. By pushing back the OCS slope origin 320, objects close to the RWT could end up penetrating the OCS that otherwise would not. Distance "d" may be determined using approach design criteria. As shown by formula 4-3 of FIG. 4A, "d" may be determined as a function of GPI (i.e., TCH and θ), where TCH may be based upon an approximate glidepath-to-wheel height of an aircraft; for example, a recommended TCH value of 40 feet could be assigned to a height group comprising of general aviation aircraft, and a recommended TCH value of 55 feet could be assigned to a height group comprising large aircraft such as a B-747 or A-380. Besides recommended TCH values, a TCH could have a range of values between a minimum allowable TCH and a maximum allowable TCH.

Figure 3B:
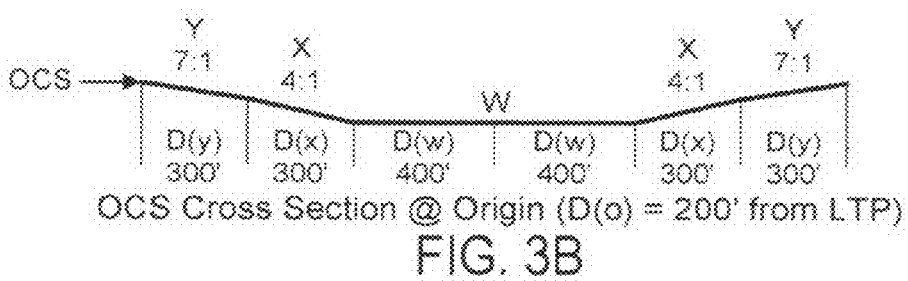
Figure 3C:
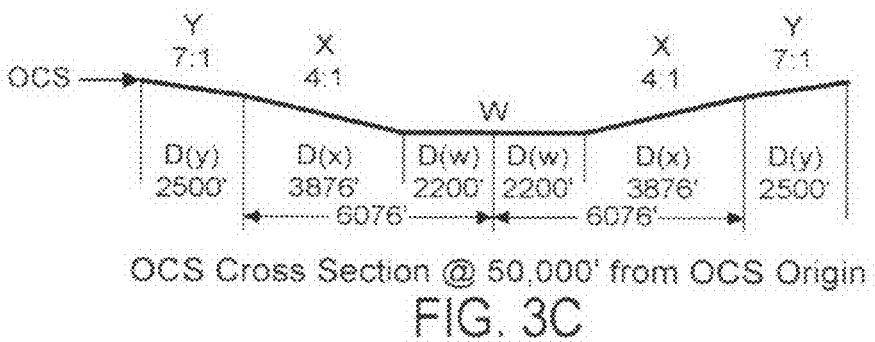

As an OCS extends away from the runway 312, the width of the OCS may expand outwardly from a final approach course centerline 318, i.e., the lateral boundaries of the OCS become wider. As shown in FIG. 3A, the outward expansion could be linear. FIGS. 3B and 3C depict cross-sections of an OCS at an OCS origin 314 located 200 feet from an LTP 310 and a second position located 50,000 feet from the OCS origin 314, respectively. A comparison between FIGS. 3B and 3C illustrates a difference in widths not only of an OCS between the two locations but also a difference in widths between the surfaces W OCS, X OCS, and Y OCS up through the second position located 50,000 feet from the OCS origin 314.

The outer boundaries of the W OCS, X OCS, and Y OCS may be determined using approach design criteria. For example, perpendiculars extending from points along the final approach course centerline 318 may be used to locate corresponding points along each of the boundaries. As shown by formulas 4-4, 4-5, and 4-6 in FIG. 4A, perpendicular distances W(w), W(x), and W(y) between a point on the course centerline and respective points on the W OCS boundary, X OCS boundary, and Y OCS boundary may be determined as a function of distance D, where D may be the distance between a LTP or FTP and to a point on the course centerline.

Application of formulas 4-4, 4-5, and 4-6 results in the distances shown in FIG. 3B. The outer boundaries of the W surface, X surface, and Y surface at the OCS origin 314 are 400 feet, 700 feet (400'+300'), and 1,000 feet (400'+300'+300'), respectively, and perpendicular to the centerline of the final approach course located at the midpoint of the W surface. Likewise, as shown by the distances shown in FIG. 3C, the outer boundaries of the W surface, X surface, and Y surface at a position 50,000 feet from the OCS origin 314 are 2,200 feet, 6,076 feet, and 8,576 feet (i.e., 2,200'+6,076'), respectively, and perpendicular to the centerline of the final approach course located at the midpoint of the W surface.

An OCS may comprise one or more surfaces between laterally sloping surfaces. As indicated in both FIGS. 3B and 3C, the outward run over rise of X OCS is 4:1 from the outer boundary of the W OCS, and the outward run over rise of Y OCS is 7:1 from the outer boundary of the X OCS.

Besides length and width of the OCS, the height of any point on the OCS may be determined by using approach design criteria. As shown by formula 4-7 in FIG. 4A, the height $Z(w)$ of the W OCS above a reference datum such as an ASBL may be determined as a function of D, d, and S.

The heights of any point on the X OCS and the Y OCS may also be determined using approach design criteria. Height $Z(x)$ of a point on the X OCS may be determined by adding $Z(w)$ to the value of the rise of the X OCS to the point, which may be determined from a perpendicular extending horizontally from the final approach course centerline 318 to a point below the point on the X OCS. As shown by formula 4-8 in FIG. 4A, height $Z(x)$ may be determined as a function of $Z(w)$, $W(w)$, and $D(xp)$, where $D(xp)$ is the perpendicular distance between the course centerline and a point below the point on the X OCS.

Similarly, height $Z(y)$ of a point on the Y OCS may be determined by adding $Z(w)$ and $Z(x)$ to the rise of the Y OCS to the point, which may be determined from a perpendicular extending horizontally from the final approach course centerline 318 to a point below the point on the Y OCS. As shown by formula 4-9 in FIG. 4A, height $Z(y)$ may be determined as a function of $Z(x)$, $W(x)$, $W(w)$, and $D(yp)$, where $D(yp)$ is the perpendicular distance between the course centerline and a point below the point on the Y OCS.

The final approach course centerline 318 of the final approach course of the OCS depicted in FIG. 3A is shown as being aligned with an extended runway centerline; however, as depicted in FIG. 2B, the final approach course 230 may be offset 226 from an extended runway centerline 232. If an offset is used, approach design criteria could impose limits; for example, an LPV approach may be limited to an angle no greater than 3 degrees. Also, if an offset is used, design criteria impose a distance restriction for the intersection of the final approach course centerline 318 and the extended runway centerline; for example, an LPV approach may require the final approach course centerline 318 to intersect the extended runway centerline at a point 1,100 feet to 1,200 feet inside a decision altitude point (which will be discussed in detail below). In addition, if an offset is used, design criteria may require a higher minimum height above the threshold (which will be discussed in detail below).

In the discussion above, a reference datum such as an ASBL could have been used in the determination of heights $Z(w)$, $Z(x)$, and $Z(y)$. Alternatively, heights of points on the W surface, X surface, and Y surface may be expressed as elevations above mean sea level, and the elevation LTP(elev) of the LTP 310 and the radius r of the Earth could serve as a reference datum in approach design criteria. As shown by formula 4-10 shown in FIG. 4A, the elevation $Z(we)$ of the W OCS may be determined as a function of LTP(elev), $\theta$, d, r, and D. After determining $Z(we)$, the elevation $Z(xe)$ of the X OCS and the elevation $Z(ye)$ of the Y OCS could be found by adding $Z(we)$ to $Z(x)$ and $Z(y)$, respectively.

After an OCS has been created for a specific runway, the OCS may be examined for surface object penetration. A known height of an object could be compared with the height of either the W Surface, X Surface, or Y Surface above it, and if the height of the object is greater than $Z(w)$, $Z(x)$, or $Z(y)$, respectively, then the object has penetrated the OCS. Similarly, a known elevation of an object could be compared with the elevation of either the W Surface, X Surface, or Y Surface above it, and if the elevation of the object is greater than $Z(we)$, $Z(xe)$, or $Z(ye)$, respectively, then the object has penetrated the OCS.

Alternatively, object penetration of the X Surface may be examined by adjusting (or reducing) the height of the object by the amount of rise to the object between the outer boundary of the W Surface and the X Surface. If such adjustment is made, the adjusted object height could be compared with the height of the W Surface, and if the adjusted object height is greater than $Z(w)$, then the object has penetrated the OCS. An object height adjustment factor $Q(x)$ of the X Surface may be determined by using approach design criteria. As shown by formula 4-11 in FIG. 4A, $Q(x)$ may be determined as a function of $D(xp)$ and $W(w)$.

Similarly, object penetration of the Y Surface may be examined by adjusting (or reducing) the height of the object by the amount of rise to the object between the outer boundary of the W Surface and the X and Y Surfaces. If such adjustment is made, the adjusted object height could be compared with the height of the W Surface, and if the adjusted object height is greater than $Z(w)$, then the object has penetrated the OCS. An object height adjustment factor $Q(y)$ of the Y Surface may be determined by using approach design criteria. As shown by formula 4-12 in FIG. 4A, $Q(y)$ may be determined as a function of $W(x)$, $W(w)$, and $D(yp)$.

Object penetration of the OCS may be examined by determining an effective object mean sea level elevation $O(ee)$ of the object elevation $Z(obs)$. Then, $O(ee)$ may be compared with $Z(we)$, and if $O(ee)$ is greater than $Z(we)$, then the object has penetrated the OCS by a penetration distance p. In such evaluation, elevation LTP(elev) and radius r could serve as a reference datum in approach design criteria. As shown by formula 4-13 in FIG. 4B, $O(ee)$ may be determined as a function of $Z(obs)$, r, LTP(elev), $D(obs)$, and Q, where $D(obs)$ is the perpendicular distance between a point on the course centerline and the object, and if applicable, Q is $Q(x)$ or $Q(y)$.

An OCS that has been penetrated may be adjusted if necessary. The adjustment may be necessary if an object is penetrating the OCS and no remedy exists to address the penetration. In one embodiment, an adjustment could be made through the use of an iterative process as discussed in detail below. In an alternative embodiment, an adjustment could be made through the use of a path construction function as discussed in detail below.

In an alternative embodiment, the adjustment of the OCS could depend on a minimum obstacle clearance distance between the penetrating object and the glidepath at a corresponding location of the penetrating object. The height or elevation of the glidepath could be vertically offset by the value of a minimum obstacle clearance distance. The value of a minimum obstacle clearance distance could be fixed or variable determined as a function of one or more criteria by a manufacturer or end user. For example, it may be determined as a function of alerting criteria established for a TAWS system. For each penetrating object, if the height or elevation of the object does not exceed the height or elevation of the vertically offset glidepath corresponding to the location of the object, then the adjustment to the OCS may not be necessary.

If an adjustment is made, it could be limited. For example, the values of LTP(elev) and GPA may be limited by approach design criteria, where such limitation could be based on the category of aircraft.

One of the purposes of examining an OCS for object penetration is to establish a decision altitude of the approach procedure. A decision altitude may be an altitude along the final approach descent path (or glidepath) at which a missed approach must be initiated if, for instance, visual references of the runway environment have not been acquired by the pilot or flight crew. The value of a decision altitude may be affected if the OCS has been penetrated and no means are available to adjust the OCS.

A decision altitude DA may be determined by using approach design criteria. As shown by formula 4-14 in FIG. 4B, DA of an OCS free of object penetration may be determined as a function of height above threshold HATh and LTP(elev), where HATh is the height of the DA above the LTP. As shown by formula 4-15 in FIG. 4B, a distance D(DA) along the final approach course between the LTP and the position on the W OCS corresponding to DA may be determined as a function of LTP(elev), TCH, θ, DA, and r.

Alternatively, values representative of height above touchdown HAT and touchdown zone elevation TDZE may be substituted for HATh and LTP(elev) in formula 4-13, respectively. Values of HATh and HAT may be dependent upon the type of approach. For example, HATh or HAT could be set to 200 feet for the type of approach categorized as a precision approach.

If an OCS is not free of object penetration, adjustments may be made to address the penetration if no remedy exists. The aviation governing authority could determine whether the object can be moved, removed, or adjusted downward, or whether the runway could be displaced. Also, adjustments or revisions could be made to a θ, a DA, and a TCH.

The GPA 308 could be adjusted or revised using approach design criteria. As shown by formula 4-16(a) in FIG. 4B, a revised glidepath angle GPA(rev) may be determined as a function of LTP(elev), d, O(ee), and D. Alternatively, as shown by formula 4-16(b) of FIG. 4B, GPA(rev) could be determined as a function of D, d, S, and p, where p may be the distance of object penetration. The value of GPA(rev) may be subject to a limitation, however, based upon an approach category assigned to the aircraft, where such category may be based upon an aircraft speed.

The DA could be adjusted or revised using approach design criteria. It may be preferable to see the lowest DA possible so that the aircraft can to get as close as possible to the runway. As shown by formula 4-18 in FIG. 4B, an adjusted decision altitude DA(adj) may be determined as a function of r, d, LTP(elev), TCH, 8, O(ee), and D(adj), where D(adj) may be a distance along the final approach course between the LTP and the position on the W OCS where the elevation of the W OCS is equal to O(ee). The TCH could be adjusted or revised using approach design criteria. As shown by formula 4-17 in FIG. 4B, a revised threshold crossing height TCH(rev) may be determined as a function of 8, d, p, and Z(relief), where Z(relief) may be the maximum W Surface relief that may be achieved by adjusting TCH. The value of TCH(rev) may be limited to a range between a minimum allowable TCH and a maximum allowable TCH. As stated above, the determination of a decision altitude DA may depend on whether an OCS has been penetrated or not. This includes an OCS associated with a missed approach procedure. The drawings of FIG. 5 illustrate an OCS that could be applicable to a missed approach segment of a precision final approach or an LPV approach (not drawn to scale). FIG. 5A presents a plan view and profile view of an OCS having a slope and located below a climb path; the OCS is depicted as a continuation of a final approach course as shown in FIG. 5A.

As illustrated in the drawings of FIG. 5, the location of DA 350 could be the beginning of section 1a of a missed approach, and a second location shown by item 352 could be the end of section 1a. Section 1a may be a continuation of the final approach OCS for distance L(a1) from DA 350 using approach design criteria. This distance could be fixed or variable, and as shown in FIG. 5A, L(a1) is fixed at 1,460 feet. The continuation of the final approach OCS is advantageous because it accommodates for the height loss associated with the transition from the final approach glidepath 354 to the missed approach. The W OCS, X OCS, and Y OCS of the final approach OCS are identified in section 1a as 1aW OCS, 1aX OCS, and 1aY OCS of the missed approach OCS. The approach design criteria and formulas stated above regarding OCS dimensions, object penetration examination, and adjustments or revisions to a GPA, a DA, and a TCH to address an object penetration could still apply in section 1a. For example, widths W(1aw), W(1ax), and W(1ay) of the W OCS, X OCS, and Y OCS at the end of section 1a may be determined using formulas 4-4, 4-5, and 4-6, respectively, where D=D(DA)-L(a1) or D=D(adj)-L(a1), as applicable. For another example, the elevation Z(a1) at the end of 1aW OCS may be determined using formula 4-10, where D=D (DA)-L(a1) or D=D(adj)-L(a1), as applicable.

As illustrated in the drawings of FIG. 5, section 1b may begin at a location shown by item 352 and end at a location shown by item 356. Section 1b may be comprised of a plurality of surfaces, and as shown, it is comprised of a 1bW surface ("1bW OCS"), a 1bX surface ("1bX OCS"), and a 1by surface ("1by OCS"). The slope S(ma) 358 of these surfaces is depicted as having a run over rise of 28.5:1, and a climb gradient ("CG") 360 of the climb path is depicted as having a run over rise of 200 feet/NM. As shown by formula 6-1 in FIG. 4A, slope S(ma) may be measured as run over rise and may be determined as a function of CG (as measured in units of feet/NM) using approach design criteria.

Also, 1bX OCS and 1bY OCS may laterally slope. Like the X OCS and Y OCS of the final approach OCS above, the 1bX OCS is a laterally sloping surface having an outward run over rise of 4:1 from each outer boundary of the 1bW OCS and 1by OCS is laterally sloping surface having an outward run over rise of 7:1 from each outer boundary of the 1bx OCS.

Each of the section 1b surfaces may begin from the end of its respective section 1a surface and extend to a distance ascertainable using approach design criteria. This length L(1b) of the 1b surface could be fixed or variable, and as shown in FIG. 5, it is fixed at 8,401 feet. The width of the 1b surface expands outwardly from a missed approach course centerline, i.e., the lateral boundaries of the OCS become wider. As shown in FIG. 5, the outward expansion could be linear until reaching the end at line ab. The width W(1b) at the end surface 1b is shown to be 3,308 feet on either side of the missed approach course centerline.

The outer boundaries of the 1bW OCS, 1bX OCS, and 1bY OCS may be determined using approach design criteria. For example, perpendiculars extending from points along the missed approach course centerline may be used to locate corresponding points along each of the boundaries. As shown by formulas 6-2, 6-3, and 6-4 in FIG. 6, perpendicular distances W(1bw), W(1bx), and W(1by) between a point on the course centerline and respective points on the 1bW OCS boundary, 1bX OCS boundary, and 1bY OCS boundary may be determined as functions of distance D(1b), L(1b), W(1b), W(law), W(1ax), and W(1ay) as applicable, where D(1b) may be the distance between the course centerline end of section 1a and a point along the centerline.

The elevations Z(1bw), Z(1bx), and Z(1by) of any point of the 1bW OCS, 1bX OCS, and 1by OCS, respectively, may be determined using approach design criteria. As shown by formulas 6-5, 6-6, and 6-7 in FIG. 6A, elevations Z(1bw), Z(1bx), and Z(1by) may be determined as functions of Z(a1), D(1b), r, S(1b), D(1bxp), and D(1byp), where D(1bxp) is the perpendicular distance between the missed approach course centerline and a point below the point on the 1bx OCS, and D(1byp) is the perpendicular distance between the course centerline and a point below the point on the 1bY OCS.

After an OCS has been created for section 1b, it may be examined for surface object penetration. Object penetration of the 1bW surface may be examined by comparing Z(1bW) with the object height, and if the object height is greater than Z(1bw), then the object has penetrated the OCS. Object penetration of the 1bX surface and 1bY surface may be examined by adjusting (or reducing) the height of the object by the amount of rise to the object between the outer boundary of the 1bW surface and the 1bX surface and 1bY surface. If such adjustment is made, the adjusted object height could be compared with the height of the 1bW surface, and if the adjusted object height is greater than Z(1bw), then the object has penetrated the OCS. An object height adjustment factor Q(1bx) of the X surface and Q(1by) of the Y surface may be determined by using approach design criteria. As shown by formulas 6-8 and 6-9 in FIG. 6A, Q(1bx) and Q(1by) may be determined as functions of D(1bxp), W(1bw), and W(1bx), W(1bw), and D(1byp) as applicable.

Object penetration of the section 1b OCS may be examined by determining an effective object mean sea level elevation O(ee) of the object elevation Z(obs). Then, O(ee) may be compared with Z(1bw), and if O(ee) is greater than Z(1bw), then the object has penetrated the OCS by a penetration distance p. By using formula 4-13 shown in FIG. 4B, O(ee) may be determined as a function of Z(obs), r, LTP(elev), D(obs), and Q, where D(obs) is the perpendicular distance between a point on the missed approach course centerline and the object, and Q is Q(1bx) or Q(1by) (if applicable).

As discussed above, penetration may be permissible if a minimum obstacle clearance distance between the penetrating object and the climb path at a corresponding location of the penetrating object. Likewise, the height or elevation of the climb path could be vertically offset by the value of a minimum obstacle clearance distance. In one embodiment, the height or elevation of the climb path could be vertically offset by the value of a minimum obstacle clearance distance. For example, it may be determined as a function of a required terrain clearance requirement applicable for a departure or alerting criteria established for a TAWS system. For each penetrating object, if the height or elevation of the object does not exceed the height or elevation of the vertically offset climb path corresponding to the location of the object, then the adjustment to the OCS may not be necessary. In another embodiment, an adjustment could be made through the use of an iterative process as discussed in detail below. In an alternative embodiment, an adjustment could be made through the use of a path construction function as discussed in detail below.

If an adjustment is made, it could be limited. For example, the values of LTP(elev) and GPA may be limited by approach design criteria, where such limitation could be based on the category of aircraft.

The existence of an obstacle penetrating a surface of the section 1b OCS may affect the determination of the decision altitude DA of the final approach descent path (or glidepath) by raising it and moving it further away from the LTP if an OCS may not be adjusted. As shown by formula 6-10 in FIG. 6, an adjusted decision altitude DA(1badj) may be determined as a function of LTP(elev), TCH, θ, D(DA), and D(1badj), where D(1badj) may be a distance along the final approach course the DA point moves further away from the LTP and based on the numerical values shown in FIG. 5.

The drawings of FIG. 7 illustrate an OCS comprised of a plurality of surfaces that could be applicable to a final approach segment of a LNAV/VNAV approach (not drawn to scale); the shaded portions indicate the OCS. FIG. 7A presents a plan view and profile view of an OCS having a slope 402 and located below a glidepath 404 extending from a FPCP 406 and having a GPA 408 of θ; as stated above, an FPCP may be an imaginary point above the LTP 410 (or an FTP) at the TCH from which the glidepath mathematically emanates. Slope S may be measured as run over rise. Slope could also be based on a temperature spread, where the temperature spread could be the difference between an airport International Standard Atmosphere temperature ISA associated with an airport elevation and an average coldest temperature ACT associated with the airport (which could be a standard temperature for the location of the airport or a temperature determined using historical temperature records). As shown by formula 8-1 in FIG. 8, slope S may be determined as a function of GPA 408, ISA, and ACT.

As stated above, the origination of an OCS may be determined using a point of reference. As embodied in FIG. 7A, an LTP 410 of a runway 412 (or FTP if applicable) could serve as a reference point from which the origin or beginning of an OCS, i.e., the OCS origin 414, may be determined. As depicted in FIG. 7A, the OCS (shown as shades) could begin at a distance D(o) 416 from the LTP 410 measured along the final approach course centerline 418. Distance D(o) may be determined using approach design criteria. As shown by formula 8-2 in FIG. 8B, D(o) may be determined as a function of TCH and θ.

The OCS could extend to a second position located at a fixed distance from an OCS origin 414 or some other position determinable through the application of approach design criteria. As depicted in FIG. 7A, the OCS extends to a position determinable as a fixed distance from a PFAF 420; specially, the OCS extends 0.3 miles beyond the PFAF 420. The distance D(PFAF) between the LTP 410 and PFAF 420 may be determined using elevation LTP(elev) and r as reference data in approach design criteria. As shown by formula 8-3 in FIG. 8B, D(PFAF) may be determined as a function of the LTP (elev), r, θ, TCH, and alt(min).

As an OCS extends away from the runway 412, the width of the OCS may remain constant until reaching a position determinable through the application of approach design criteria, and then expands outwardly from a final approach course centerline 418 so that the lateral boundaries of the OCS become wider. The outward expansion could be linear as shown in FIG. 7A. FIGS. 7B and 7C depict cross-sections of an OCS at a first location located 1.0 NM before a PFAF 420 and a second position located 0.3 NM beyond a PFAF 420, respectively. A comparison between FIGS. 7B and 7C illustrates a difference in widths not only of an OCS between the two locations but also a difference in widths between the Primary OCS ("P OCS") and Secondary OCS ("S OCS") beginning at a position located 1.0 NM before the PFAF 420.

The outer boundaries of the primary OCS and secondary OCS between positions located 1.0 NM before the PFAF 420 and 0.3 NM beyond the PFAF 420 may be determined using approach design criteria. For example, perpendiculars extending from points along the final approach course centerline 418 may be used to locate corresponding points along each of the boundaries. As shown by formulas 8-4 and 8-5 in FIG. 8, perpendicular distances W(p) and W(s) between a point on the course centerline and respective points on the P OCS and S OCS boundaries may be determined as a function of D(PFAF) and distance D, where D is the distance between a LTP or FTP and a point on the course centerline.

Application of formulas 8-4 and 8-5 result in the distances shown in FIG. 7B. The outer boundaries of the P OCS and S OCS at the OCS origin 414 are 3,645.6 feet and 5,468.4 feet (i.e., 3,645.6'+1,822.8'), respectively, and perpendicular to the centerline of the final approach course located at the midpoint of the P OCS. Likewise, as shown by the distances shown in FIG. 7C, the outer boundaries of the P OCS and S OCS at a position 0.3 NM beyond the PFAF 420 are 7,331.7 feet and 10,997.55 feet (i.e., 7,331.7'+3,665.85'), respectively, and perpendicular to the centerline of the final approach course located at the midpoint of the P OCS.

As stated above, an OCS may comprise of one or more laterally sloping surfaces. As indicated in both FIGS. 7B and 7C, S OCS is a laterally sloping surface having an outward run over rise of 7:1 from each outer boundary of the P OCS.

After an OCS has been created, it may be examined for object penetration of the OCS. Approach design criteria may require the application of the OCS to being at a point where the OCS reaches a height specified in the criteria. Object clearance distance height h(OCS) may be a height above the LTP(elev); for the OCS of FIG. 7A, h(OCS) is assumed to be equal to 89 feet (not shown). With h(OCS), the distance D(OCS) from the LTP to the position along the final approach course centerline where the application of the OCS may begin for the purpose of examining for penetration. As shown by formula 8-6 in FIG. 8, D(OCS) may be determined as a function of LTP(elev), S, D(o), r, and h(OCS).

The elevation Z(p) of the P OCS at any point along the final approach course centerline at a distance D from the LTP may be determined by using approach design criteria. As shown by formula 8-7 in FIG. 8, Z(p) may be determined as a function of LTP(elev), D(OCS), S, D, and r.

Z(obs) may be compared with Z(p) of any point on the OCS to examine for object penetration of the OCS. For an object located with the boundaries of S OCS, the elevation of the object may be adjusted or reduced by the amount of rise to the object between the outer boundary of the P surface and the S surface. If such adjustment is made, the adjusted object elevation Z(adj) may be compared with Z(p) to examine for object penetration of the OCS. By using formula 8-8 (4-10) shown in FIG. 8, Z(adj) may be determined as a function of Z(obs), D(sp), and W(p), where Z(sp) is the perpendicular distance between the course centerline and a point below the point on the S OCS. Then, if Z(obs) or Z(adj) is greater that Z(p), then the object has penetrated the OCS.

As discussed above, an OCS that has been penetrated may be adjusted if necessary. The adjustment may be necessary if an object is penetrating the OCS and no remedy exists to address the penetration. In one embodiment, an adjustment could be made through the use of an iterative process as discussed in detail below. In an alternative embodiment, an adjustment could be made through the use of a path construction function as discussed in detail below.

In an alternative embodiment, the adjustment of the OCS could depend on a minimum obstacle clearance distance between the penetrating object and the glidepath at a corresponding location of the penetrating object. The height or elevation of the glidepath could be vertically offset by the value of a minimum obstacle clearance distance. The value of a minimum obstacle clearance distance could be fixed or variable determined as a function of one or more criteria by a manufacturer or end user. For example, it may be determined as a function of alerting criteria established for a TAWS system. For each penetrating object, if the height or elevation of the object does not exceed the height or elevation of the vertically offset glidepath corresponding to the location of the object, then the adjustment to the OCS may not be necessary.

If an adjustment is made, it could be limited. For example, the values of LTP(elev) and GPA may be limited by approach design criteria, where such limitation could be based on the category of aircraft.

One of the purposes of examining an OCS for object penetration is to establish a decision altitude of the approach procedure. A decision altitude DA may be determined by using approach design criteria. As shown by formula 8-9A in FIG. 8, DA may be determined as a function of h(OCS) or Z(obs) (Z(adj) if applicable). If one or more objects penetrate the OCS, DA may be determined with other approach design criteria. As shown by formula 8-9B in FIG. 8, DA may be determined as a function of θ, Z(obs) (or Z(adj) if applicable), D(o), LTP(elev), S, TCH, and r, where Z(obs) or Z(adj) is the elevation of the highest penetrating object. After determining the higher DA, the distance D(DA) from the LTP may be determined by approach design criteria. As shown by formula 8-10 in FIG. 8, D(DA) may be determined as a function of LTP(elev), TCH, θ, and DA.

The final approach course centerline 418 of the final approach course of the OCS depicted in FIG. 7 is shown as being aligned with an extended runway centerline; however, as depicted in FIG. 2B, the final approach course 230 may be offset 226 from an extended runway centerline 232. If an offset is used, approach design criteria could impose limits. For example, an LNAV/VNAV approach may be limited to an angle α no greater than 15 degrees. Design criteria may also impose a distance restriction for the intersection of the final approach course centerline 418 and the extended runway centerline. If a is less than or equal to 5 degrees, an approach may require the final approach course centerline 418 to align the course through the LTP. If a is greater than 5 degrees but less than or equal to 10 degrees, an approach may require the final approach course centerline 418 to intersect the extended runway centerline at a point located at a distance d1 between 1,500 and 5,200 feet prior to the LTP. If an offset is greater than 10 degrees but less than or equal to 15 degrees, an approach may require the final approach course centerline 418 to intersect the extended runway centerline at a point located at a distance d1 between 3,000 and 5,200 feet prior to the LTP. Design criteria may also impose a minimum height HATh(min) to the value of the height above threshold. As shown by formula 8-11 in FIG. 8, HATh(min) may be determined as a function of d1, α, θ, LTP(elev), TCH, and V(KIAS), where V(KIAS) is the indicated airspeed in knots that may be determined by the category of the aircraft. If the difference between the DA and LTP(elev) is less than the HATh(min), then the DA may be adjusted or increased until the difference is zero.

The drawings of FIG. 9 illustrate an application of an OCS to a missed approach segment of a LNAV/VNAV approach (not drawn to scale). As illustrated in the drawings of FIG. 9, the location of DA 370 could be the beginning of section 1 of a missed approach, and a second location shown by item number 372 could be the end of section 1 which could be a specified height above the airport elevation (e.g., 400'). It may comprise of one or more surfaces. It may comprise a flat surface 374 and a rising surface 376 if a climb to the specified height above the airport elevation is necessary.

The area from the location of the DA 370 to the end of the flat surface 378 may be termed a "flat surface." The length FSL of the flat surface 374 may be constructed using approach design criteria. As shown by formula 10-1 in FIG. 10, FSL may be determined as a function of V(KIAS) and DA. The end of the flat surface is nominally indicated by item 378; if the DA is lower than 400 feet above the elevation of the airport, a rising surface having a slope S(mas) (e.g., 40:1) could be added as a surface extension. The length s1 of the extension could be determined by approach design criteria. As shown by formula 10-2 in FIG. 10, s1 may be determined as a function of Z(ext) and CG, where Z(ext) is number of feet needed to climb to 400 feet above the airport elevation.

The outer boundaries of the P1 OCS and S1 OCS may be determined using approach design criteria. For example, perpendiculars extending from points along the missed approach course centerline may be used to locate corresponding points along each of the boundaries. As shown by formulas 10-3 and 10-4 in FIG. 10, perpendicular distances W(p1) and W(s1) between a point on the course centerline and respective points on the P1 OCS boundary and S1 OCS boundary may be determined as functions of distance D(DA1), where D(DA1) may be the distance between the DA point and a point along the centerline.

The elevation Z(mas) of the OCS below the DA 380 may be determined by approach design criteria. As shown by formula 10-4 in FIG. 10, Z(mas) may be determined as a function of DA and h1, where h1 may be a constant that depends on the category of aircraft.

For object penetration of the flat surface 374, approach design criteria may require an examination of Z(obs) and Z(mas), and if Z(obs) is greater that Z(mas), then the object has penetrated the OCS by p; if penetration exists, then the DA may be raised by the amount p. For object penetration of the rising surface 376, approach design criteria may require the determination of an adjusted decision altitude DA(mas). As shown by formula 10-6 (4-17) in FIG. 10, DA(adj) may be determined as a function of p, $\theta$, and S(mas).

As embodied herein, a missed approach procedure may be a standard or optional segment of an approach procedure. A missed approach procedure could include an initial heading or track and altitude to climb to a navigation fix. As noted from the discussion above, Sections 1 of the object clearance surfaces for the LPV and LNAV/VNAV missed approach procedures do not end at a navigation fix. A Section 1 OCS may provide a link connecting a point associated with a final missed approach with a point of a Section 2 OCS. For each OCS, Section 1 may terminate at a position ascertainable by approach design criteria.

An OCS for Section 2 of a missed approach procedure may be constructed using approach design criteria. Missed approach design criteria may be established to allow a pilot to fly an aircraft from the runway environment to a navigation fix. These criteria may cover one or more types of missed approach procedures including, but not limited to, straight approach procedures and turning approach procedures. Although there could be more than one type of missed approach procedure, each could require an OCS comprising of one or more surfaces used in the evaluation of object clearance, where each OCS may be defined using approach design criteria. Just as approach design criteria was employed for constructing an OCS and conducting an examination for object penetration in the discussions above related to the exemplary LPV and LNAV/VNAV procedures, approach design criteria may be employed for constructing a Section 2 OCS between a point at the end of Section 1 to a navigation fix termination of the approach procedure. If an object is found to penetrate a surface of a Section 2 OCS, adjustments or revisions may be made if a remedy does not exist to address the issue of object penetration.

In one embodiment, an adjustment could be made through the use of an iterative process as discussed in detail below. In an alternative embodiment, an adjustment could be made through the use of a path construction function as discussed in detail below. In an alternative embodiment, the adjustment of the OCS could depend on a minimum obstacle clearance distance between the penetrating object and the glidepath at a corresponding location of the penetrating object. The height or elevation of the glidepath could be vertically offset by the value of a minimum obstacle clearance distance. The value of a minimum obstacle clearance distance could be fixed or variable determined as a function of one or more criteria by a manufacturer or end user. For example, it may be determined as a function of alerting criteria established for a TAWS system. For each penetrating object, if the height or elevation of the object does not exceed the height or elevation of the vertically offset glidepath corresponding to the location of the object, then the adjustment to the OCS may not be necessary.

If an adjustment is made, it could be limited. For example, the values of LTP(elev) and GPA may be limited by approach design criteria, where such limitation could be based on the category of aircraft.

If no remedy exists, then adjustments or revisions may be made to a final approach OCS, Section 1 OCS, and/or Section 2 OCS to ensure object clearance for the entire approach procedure using approach design criteria such as, for example, those adjustments or revisions discussed above.

As stated above, approach design criteria may be developed by an aviation-governing authority. For the purposes of illustration and not limitation, FAA Orders 8260.3B and 8260.54A contain approach design criteria for generating an OCS associated not only for final approach and Section 1 missed approach procedures but also for a Section 2 missed approach. Not only do the Orders contain criteria associated with LPV and LNAV/VNAV approach procedures, but they contain criteria for generating other approach procedures not discussed herein. As stated above, the embodiments disclosed herein could include any approach procedure using approach design criteria to generate an OCS for the purpose of providing object clearance between two or more ascertainable fixes or positions, where the approach design criteria are not limited to those approach procedures designed by the FAA. In the event changes are made to existing approach design criteria or new approach design criteria are developed, those skilled in the art will appreciate the ability and ease with which executable software code may be reprogrammed or modified by a manufacturer or end user to facilitate future changes related to approach design criteria.

The advantages and benefits of the embodiments discussed herein may be illustrated by showing examples of how approach data may be generated for runways that have existing approach procedures but may not provide vertical guidance or for runways that do not have existing approach procedures (including those which may be limited to specific category of aircraft). The generation of approach data could also be made real-time during flight. As discussed above, providing object clearance may be accomplished by ensuring an OCS is free from object penetration. If adjustments or revisions are made because of a penetrating object, this could result in an undesirable increase to a DA. As embodied herein, object penetration may be permitted which, in effect, permits a lower DA.

FIGS. 11 and 12 depict two approach procedures established by the FAA and modified for the purpose of discussion only. As presented herein, they are not suitable for navigation. These are presented herein for the purposes of discussion only. FIG. 11 illustrates approach procedure "GPS RWY 26"

established for Runway 26 at Rifle/Garfield County Regional Airport ("RIL") in the State of Colorado, United States, and FIG. 12 illustrates approach procedure "LOC/DME-A." GPS RWY 26 of FIG. 11 is an approach procedure that complies with RNAV approach design criteria. The lack of the words "RNAV (GPS)" in the title "GPS RWY 26" may indicate that this approach may have been an overlay of a previous approach that was based on conventional, ground-based NAVAID but has since converted to a stand-alone approach procedure using waypoints having located at a specified latitude and longitude. Because this procedure could have been predicated upon approach design criteria of a ground-based NAVAID, it may not adhere to RNAV approach design criteria for stand-alone GPS procedures such as, but not limited to, LPV and LNAV/VNAV approach procedures.

As indicated in FIG. 11, approach design criteria applied for a ground-based NAVAID approach (from which the GPS approach procedure has been converted) may have produced a final approach course of 257°, a GPA of 3.68°, a Final Approach Fix ("FAF") designated by the waypoint "ANTEJ" and having an altitude of at least 9,500 feet, minimum decision altitude ("MDA") of 7,820' MSL, and a MAP at the waypoint "SEQRY." Because this approach procedure has been adopted for the use of aircraft installed with a GPS navigation system including an airborne database, waypoints could be stored in the database. The location of ANTEJ is latitude ("lat.") 39°31'48.97" N, longitude ("long.") 107°29'57.22" W, and the location of SEQRY is lat. 39°31'33.85" N, long. 107°42'13.63" W.

The LTP(elev) of Runway 26 has been surveyed to be 5,544' MSL (not shown). By subtracting this value from the MDA, it is determined that the minimum descent height ("MDH") of GPS RWY 26 is 2,276' AGL (as referenced from the LTP). Those skilled in the art recognize that the MDH is high. Other conventional, ground-based NAVAID approach procedures published for Runway 26 have lower minimum altitudes. An "ILS RWY 26" approach procedure has a DA of 7,100 feet (Decision Height ("DH") of 1,556' AGL), and a "LOC/DME-A" approach procedure has an MDA of 7,400' MSL (MDH of 1,876' AGL); the LOC/DME-A approach procedure will be discussed below; those skilled in the art recognize that a DH and MDA (or DH and MDH) serve the same function, where a DH is typically used in precision approaches and MDH is typically used for non-precision approaches. A comparison between the conventional, ground-based procedures and the GPS-based procedure shows that the former procedures provide a 720' and 400' advantage over the latter.

At the time of this writing, RIL does not have a published RNAV approach procedure that adheres to RNAV approach design criteria for stand-alone approach procedures such as, but not limited to, LPV and LNAV/VNAV approach procedures. The advantages and benefits of the embodiments herein may be recognized through the construction of approach procedures that could result in lower minimum altitudes while drawing on existing waypoints and other navigation fixes.

The existing waypoints of GPS RWY 26 could be used to possibly construct a procedure using LNAV/VNAV approach design criteria. As discussed above, the LNAV/VNAV procedure may be based on a temperature spread between an airport ISA and the temperature to which the approach procedure is protected and may be limited if the reported temperature is below the ACT. For the purposes of the remaining discussion herein, it will be assumed that there is no temperature restriction.

As discussed above, the value of a GPA may be limited, and such limitation could be based on the category of aircraft. For example, a maximum allowable GPA for categories A, B, C, and D & E aircraft may be 5.7°, 4.2°, 3.6°, and 3.1°, respectively, where such categories may be based upon an aircraft speed. It is noted that the glidepath is 3.68°. Because the maximum allowable GPA exceeds the glidepath for categories C and D & E aircraft, this approach would be unavailable for these categories of aircraft. As discussed below in detail, a path finding function may be performed to determine a new approach path, and from there, to construct an OCS from which object penetration may be examined.

Assuming that the approach will be limited to category A and B aircraft only, an OCS may be constructed using approach design criteria as discussed above. For runway 26, the magnetic bearing is 260.6°, the LTP is located at lat. 39°31'36.45" N, long. 107°42'52.39" W, and the TCH has been set to 59'. Also, an object with an elevation of 5,969' is located approximately 2.0 NM from the LTP. Application of approach design criteria and associated functions of an LNAV/VNAV approach procedure may yield a resulting DA of 5,814' MSL (DA of 270' AGL). A comparison of the resulting DA and the MDA of the GPS RWY 26 procedure shows a decrease in the altitude of 2,006', which would be recognized by those skilled in the art as a substantial improvement because it permits the aircraft to descend further along the glidepath to a lower altitude, allowing the pilot to fly closer to the runway before he or she decides whether to land or begin a missed approach procedure based, in part, on having the runway environment in sight.

The existing waypoints of GPS RWY 26 approach procedure could be used to possibly construct a procedure using LPV approach design criteria. The final approach course is 257°. As discussed above, the LPV approach is limited to an offset of 3°. A comparison of the final approach course of 257° and runway bearing 260.6° yields a result that exceeds the 3° limitation; as such, an LPV would not be available using the established waypoints of GPS RWY 26 approach procedure.

Although LPV approach design criteria may not be applied to the existing waypoints of GPS RWY 26, the existing waypoints of the LOC/DME-A approach procedure shown in FIG. 12 could be used to possibly construct a procedure using LPV approach design criteria; the title of the approach procedure suggests that a conventional, ground-based NAVAID comprising a localizer and a collocated distance measuring equipment ("DME") are used to define the procedure. A previous application of approach design criteria for a localizer approach procedure may have produced a final approach course of 261°, a GPA of 3.00° (the standard GPA), an FAF designated by the navigation fix "LOCAT" and having an altitude of at least 9,800 feet, an MDA of 7,400' MSL, and a MAP at a navigation fix located 2.7 NM from a localizer designated "I-RIL." Although this approach procedure has not been adopted for the use of aircraft installed with a GPS navigation system including an airborne database, the FAA has determined that LOCAT is located at lat. 39°31'08.53" N, long. 107°32'29.30" W, and that MAP is located at lat. 39°31'28.68" N, long. 107°41'04.04" W. These coordinates may be stored in the database and used as waypoints in the construction of a LPV approach.

Application of approach design criteria and associated functions of an LPV approach procedure may yield a resulting DA of approximately 6,300' MSL (DA of 756' AGL). A comparison of the resulting DA and the MDA of the GPS RWY 26 procedure shows a decrease in the altitude of 1,520' AGL, which would be recognized by those skilled in the art as a substantial improvement. Although the construction of an LPV procedure results in a DA of 6,300' MSL, the construction of an LNAV/VNAV procedure results in a more preferable DA of 5,814' MSL. As such, the construction of an LNAV/VNAV approach procedure using the existing waypoints of GPW RWY 26 improves the chances of a successful landing by an aircraft because it may descend closer to the runway while ensuring an object-free glidepath based on an OCS free from object penetration inherent in approach design criteria.

It should be noted that the higher DA resulting from the application of LPV approach design criteria has been due to the object having the elevation of 5,969'. Had the OCS been free of this object and assuming a GPA of 3.68°, then a DA of 5,744' would have been yielded by the criteria and formulas, a 70' improvement over the DA of the LNAV/VNAV approach procedure.

The preceding examples illustrate the use of existing waypoints from published approach procedures, but other waypoints including those associated with the airport and other approach published procedures at the airport could be examined for possible use in the construction of an approach procedure through the application of approach design criteria and formulas. As stated above, the embodiments herein are not limited to the criteria and formulas of LPV and LNAV/VNAV approach procedures.

As stated above, an approach procedure could comprise both a final approach procedure and a missed approach procedure. Also, an examination conducted for object penetration of an OCS associated with a missed approach could affect the final approach procedure by, for example, increasing the computed DA. As such, it may be necessary to reconstruct an OCS associated with a final approach procedure in the event an OCS associated with a missed approach procedure has been penetrated.

As noted above, the published MDA of the GPS RWY 26 approach procedure is more than 2,000' above the DA determined using LNAV/VNAV approach design criteria to the existing waypoints of GPS RWY 26. If the missed approach OCS of the GPS RWY 26 approach procedure was determined as a function of the MDA and distance to the MDA from the runway threshold, then the OCS associated with the missed approach procedure may be higher than the DH of the constructed LNAV/VNAV approach procedure. An aircraft executing a missed approach from the DH would begin below the OCS of the existing OCS of GPS RWY 26. If the LNAV/VNAV approach procedure incorporates the missed approach instruction of GPS RWY 26, then an object-free missed approach path assured for the higher OCS cannot assure an object-free missed approach path of a lower OCS inherent with the lower DH. As such, an OCS would have to be generated for the missed approach procedure.

Similar to the construction of the final approach procedures above, existing waypoints or navigation points could be used to provide a missed approach course for the possible construction of a procedure using LNAV/VNAV missed approach design criteria. As indicated in FIG. 11, the missed approach procedure comprises of waypoints "SEQRY," "SAWOM," and "AWRAW," where AWRAW serves as a terminating point of the missed approach procedure. This approach procedure has been adopted for the use of aircraft installed with a GPS navigation system including an airborne database, and such database may be used to store waypoint location information. The location of SAWOM is lat. 39°29'23.81" N, long. 107°58'07.22" W, and the location of AWRAW is lat. 39°34'25.26" N, long. 108°21'13.58" W.

Having established a missed approach course using existing waypoints, an OCS may be constructed using missed approach design criteria and functions for an LNAV/VNAV approach procedure; unfortunately, if a standard climb gradient (e.g., 200 feet/NM) is assumed, the missed approach OCS would suffer significant object penetration as a result of the lower DH due to high terrain to the west and south of RIL (not shown).

To address the object penetration, one or more alternatives may be examined. In one alternative, an examination could be made to determine that value of DA that, when applied to approach design criteria and formulas, could result with the missed approach OCS free from object penetration. Assuming a climb gradient of 200 feet/NM, the application of formulas would result in a DA having an elevation of approximately 7,290', which is still an improvement of the GPW RWY 26 and LOC/DME-A MDAs of 7,820' and 7,400', respectively.

In another alternative, missed approach design criteria could be revised or altered to include a real-time CG value based on the actual flight conditions and not a standard, fixed value. As discussed above, data representative of input factors 150 may be acquired by or through aircraft systems and sensors and may be provided to a processor 170 as input. When received, the processor 170 may process the data in accordance with a climb performance algorithm that could contain the equation or equations defining climb performance. As a result, the processor 170 may determine a CG based upon the application of the real-time dynamic or static input factors 150.

If the computed CG is higher than an assumed value used for the CG (e.g., 200 feet/NM), the OCS would be elevated. Moreover, the use of a real-time computation of CG could make it possible for the LNAV/VNAV and GPS RWY 26 missed approach procedures to join up with each other if the computed climb performance was sufficiently high and the elevated OCS remained free of object penetration.

In another alternative, an examination could be made to determine the availability of a departure procedure that has been adopted for the runway such as, but not limited to, an Obstacle Departure Procedure ("ODP") and Standard Instrument Departure ("SID"). Legs or segments of the procedure defined by existing waypoints could substitute for those of the LNAV/VNAV missed approach procedure defined by the existing waypoints of the GPS RWY 26 approach procedure. It should be noted that, although the discussion herein may be drawn to ODPs or SID(s) published by the FAA, the embodiments herein are not limited to SIDs but include and apply to any procedure designed using, in whole or in part, criteria adopted to ensure object clearance protection along a flight path(s) described in the procedure.

FIG. 13 illustrates a published ODP for RIL designated as "SQUAT TWO DEPARTURE (RNAV) (OBSTACLE)" ("SQUAT 2"). As indicated in FIG. 13, the obstacle departure procedure comprises of waypoints "OMJIY," "YIRDU," and "SQUAT." This departure procedure has been adopted for the use of aircraft installed with a GPS navigation system including an airborne database, and such database may be used to store waypoint location information. The location of OMJIY is lat. 39°31'45.11" N, long. 107°48'08.52" W, YIRDU is lat. 39°26'58.58" N, long. 108°00'53.22" W., and SQUAT is lat. 39°18'33.90" N, long. 108°13'23.05" W.

The presence of SQUAT 2 suggests that the path specified in the departure procedure is clear from objects when a climb gradient of 397 feet/NM is sustained until the aircraft reaches 9,700' MSL; thereafter, the standard climb gradient of 200 feet/NM would apply until the aircraft reaches 10,500' along the track to SQUAT. Then, after reaching SQUAT, an OCS may be constructed between SQUAT and AWRAW to connect up with the terminating point of the GPS RWY 26 approach procedure, where an application of LNAV/VNAV missed approach design criteria would result with an OCS free from penetrating objects.

Moreover, missed approach design criteria could be revised or altered so that estimated climb performance of the aircraft may be used as the climb gradient criterion. If the estimated climb performance is higher than the value previously used for the climb gradient (e.g., 200 feet/NM), the OCS could be elevated. As such, it could be possible to fly to AWRAW without having to fly to SQUAT (the terminating point of the ODP). Instead, an OCS could be constructed between OMJIY or YIRDU and AWRAW to connect up with the terminating point of GPS RWY 26, where the revised or altered missed approach design criteria could be applied to examine whether either OCS is free from object penetration. If there is no penetration, then the missed approach procedure could discontinue using the ODP at OMJIY or YIRDU (as applicable) and fly directly to AWRAW.

In another alternative, an examination could be made to determine the availability of an existing waypoint or navigation fix used as a terminating point of another missed approach procedure. That is, borrowing a waypoint or navigation fix from another approach procedure for use as a terminating point. For example, the terminating point of the missed approach procedure for LOC-DME-A comprises a conventional NAVAID known to those skilled in the art as a VOR/DME ground-based station and identified as "RIL" ("RIL-VOR"). Although this approach procedure has not been adopted for the use of aircraft installed with a GPS navigation system including an airborne database, the FAA has determined that RIL-VOR is located at lat. 39°31'41.61" N, long. 107°42'58.61" W. These coordinates may be stored in the database and used as waypoints in the construction of a LNAV/VNAV missed approach procedure. While the coordinates of RIL-VOR may be known, those of the navigation fix identified in the missed approach procedure as 4.0 NM DME on R-259 of the RIL-VOR may not. The coordinates, however, may be computed using navigation data representative the navigation: location distance (4.0 NM) and direction information(259°) from RIL-VOR.

Having established a missed approach course using existing waypoints, an OCS may be constructed using missed approach design criteria and functions for a LNAV/VNAV approach procedure; if a climb gradient of 200 feet/NM is assumed, the missed approach OCS would not suffer from object penetration as a result of the lower DH at SEQRY.

As discussed above, a LNAV/VNAV approach procedure constructed using the existing waypoints of GPS RWY 26 was not available to Category C, D, and E aircraft because the GPA of 3.68° exceeded the limits set for these categories. If GPS RWY 26 had been the only established approach procedure to runway 26, it may be deduced that there is no established approach procedure for the affected categories of aircraft. To address a situation where no approach has been established for a runway, one or more alternatives may be available for constructing a glidepath.

In one alternative, an iterative process may be established where the maximum GPA for the category of aircraft may be used initially for constructing a glidepath mathematically emanating from an FPCP, where the FPCP may be determined as a function of the location of LTP (or FTP) and TCH. Using approach design criteria, an OCS could be constructed, the OCS could be examined for object penetration, and a DA could be determined based on the examination. Then, through an iterative process that varies GPA between a range of limits, TCH between a range of limits, the location of LTP or FTP between a range of maximum offsets, and the resulting GPI, a DA could be determined with each successive iteration, where the resulting GPI could be examined for intersection within the runway touchdown zone. After the iteration has been completed, a DA may be selected, and the GPA, LTP, and TCH corresponding to the selected DA may be used to form a glidepath mathematically emanating from an FPCP. A similar iterative process may be used with LPV approach design criteria where such process could include acceptable values of HATh as part of the iteration. Once selected, the DA could be then be subjected to missed approach design criteria.

In another alternative, an approach path may be constructed by using a path construction function. One such function is disclosed in a published article written by Dr. Ryan S. Y. Young and Kristen M. Jerome, "Long-Range, In-Flight 3D Trajectory Re-Planning with Airborne E*" ION NTM 2008, 28-30 Jan. 2008, San Diego, Calif. ("Airborne E*"). This published article incorporated by reference in its entirety. Although disclosed herein, the embodiments herein are not limited to the Airborne E* path construction function but include any function capable of generating a path free from objects that may be developed from navigation data associated with an airport and/or runway environment as discussed above. As embodied herein, a curved approach path may be defined and comprise a final approach path, a missed approach path, and/or departure path.

For the purpose of illustration and not limitation, Airborne E* may be employed to define an approach path, where the approach path may be the mission of Airborne E*. To define a final approach path, the path construction function could be bounded between the airspace surrounding the LTP and a second point such as, but not limited to, the approximate location of a PFAF; alternatively, the second point could be any existing or published waypoint near or in the vicinity of an extended runway centerline extending beyond the PFAF. To define a missed approach path, the path construction function could be bounded between the airspace surrounding the decision altitude point and a second point such as, but not limited to, a terminating point of an existing or published missed approach; alternatively, the second point could be any existing or published waypoint near or in the vicinity of an airport.

Once an approach path has been defined, an OCS can be constructed and examined for object penetration using approach design criteria and adjusted if penetrated and no remedy exists to allow the use of a penetrated OCS. Then, applicable decision altitude data could be determined and used in the generation of approach procedure data.

As embodied herein, a path construction function may be used as a remedy to determine whether an alternative path could be constructed meeting approach design criteria. For example, a path construction function may be applied after any adjustment or revision is made to θ, a DA, and a TCH. If an adjustment is made, it could be limited. For example, the values of LTP(elev) and GPA may be limited by approach design criteria, where such limitation could be based on the category of aircraft.

FIG. 14 depicts a flowchart 600 of an example of a method for generating procedure data used in an avionics system. The flowchart begins with module 602 with the receiving of navigation data and object data or data representative of navigation information and object information by a processor 170. As discussed above, navigation database 140 could contain information associated with, but not limited to, ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, and GNSS Landing Systems. As embodied herein, the receiving of data by a processor or the providing of data to a processor may include a step in which the processor performs a retrieval operation of such data.

Object data may be received from an object data source may include, but is not limited to, a terrain database 132, an obstacle database 134, other aircraft systems 136, or any combination thereof. As embodied herein, object data could include terrain information, obstacle information, or both. A terrain database 132 may be associated with a TAWS. As discussed above, an SVS system could provide a source of object data. In addition to database sources of object data, a non-database terrain and/or obstacle acquisition system could provide a source of object information. Such system may include, but is not limited to, a radar-based TAWS system.

The flowchart continues with module 604 with the defining of a flight path for a final approach path. The path for a final approach procedure could be a glidepath. A glidepath may have a constant GPA. An approach path may comprise of one or more ascertainable points. One point of a glidepath may be an FPCP, and another point could be a PFAF. One or more points could correspond to existing waypoints contained in a published approach procedure, where the waypoints may establish a specific location (e.g., longitude/latitude coordinate) and could be used to describe a variety of fixes in a final approach procedure including, but not limited to, RNAV waypoints, ground-based NAVAIDs, navigation fixes defined using ground-based NAVAIDs, and point(s) on a runway.

In one embodiment, data representative of an existing or published approach procedure may be used to establish a final approach path as embodied herein. For instance, a GPA of an existing approach procedure may be used. In an embodiment disclosed herein, a glidepath associated with a final approach could be defined by two or more fixes of a published or established approach procedure. For example, the location of a first fix could be a landing threshold point of a runway, and the location of a second fix could be a final approach fix. The height of the first fix could be defined as the value of a threshold crossing height, and the height of the second fix could be determined as a function of approach design criteria.

If an existing or published approach procedure has not been established for the runway or is unavailable for use because of, for example, a restriction based on a category of the aircraft, alternative means may be employed to establish a glidepath. In one embodiment, a glidepath may be derived through an iterative process such as, but not limited to, the process discussed above. In another embodiment, a glidepath may be derived through a path construction function. As discussed above, the employment of a path construction function could produce a curved final approach path. If a path construction function is employed, the design criteria functions applicable to a straight path could still be applied to a curved path. For example, the distance along the final approach course could be applied as the distance along the curved path is used, from where width of an OCS may be determined for the purpose of examining for object penetration. Moreover, restrictions or limitations including, but not limited to, those based on an offset of a final approach course and/or categories of aircraft could apply to a curved path.

The flowchart continues with module 606 with the construction of an OCS for a final approach path. As discussed herein, the final approach OCS may be constructed using design criteria. Design criteria could include data representative of the glidepath such as, but not limited to, GPA and runway magnetic bearing. Also, final approach design criteria could include navigation data representative of the runway and final approach procedure information such as, but not limited to, LTP, LTP(elev), TCH, ACT, and alt(min).

The flowchart continues with module 608 with the examining of the approach OCS for object penetration. Design criteria may be applied to determine whether object penetration has occurred, that is, whether the vertical measurement of at least one object exceeds the vertical measurement of the OCS at the location of the object. If the height or elevation of at least one object exceeds the height or elevation of the OCS at the location of the object, object penetration has occurred.

The flowchart continues with module 610 with the adjusting of the OCS using approach design criteria if necessary. The adjustment may be necessary if an object is penetrating the OCS and no remedy exists to address the penetration or to allow the use of a penetrated OCS. In one embodiment, an adjustment could be made through the use of an iterative process. In an alternative embodiment, an adjustment could be made through the use of a path construction function.

In an alternative embodiment, the adjustment of the OCS could depend on a minimum obstacle clearance distance between the penetrating object and the glidepath at a corresponding location of the penetrating object. The height or elevation of the glidepath could be vertically offset by the value of a minimum obstacle clearance distance. The value of a minimum obstacle clearance distance could be fixed or variable determined as a function of one or more criteria by a manufacturer or end user. For example, it may be determined as a function of alerting criteria established for a TAWS system. For each penetrating object, if the height or elevation of the object does not exceed the height or elevation of the vertically offset glidepath corresponding to the location of the object, then the adjustment to the OCS may not be necessary.

If an adjustment is made, it could be limited. For example, the values of LTP(elev) and GPA may be limited by approach design criteria, where such limitation could be based on the category of aircraft.

The flowchart continues with module 612 with the determining of applicable decision altitude data, where such data could include the decision altitude and distance to the decision altitude point using approach design criteria. Applicability of the decision altitude data may depend on whether the OCS was adjusted. If the OCS was adjusted, then the adjusted applicable decision altitude may be used as the applicable decision altitude data.

The flowchart continues with module 614 with the generation of data representative of a final approach procedure. A final approach procedure could include a glidepath passing through at least two fixes, where each fix may be defined by a waypoint with a corresponding altitude. A glidepath could pass through a final approach fix and a decision altitude fix. The altitude of these fixes could be determined using approach design criteria. In one embodiment, the waypoint of the PFAF could be the same waypoint of an existing FAF of an established final approach procedure; in another embodiment, the PFAF waypoint could be determined using approach design criteria. The decision altitude could be determined using approach design criteria. In another embodiment, a third fix through which a glidepath could pass through is a missed approach point. A waypoint that could define this point may be the LTP with a corresponding altitude comprising the sum of LTP(elev) and TCH and (or TCH(adj) if applicable).

As embodied herein, a final approach procedure could be constructed with a plurality of data. In one example, data representative of distance information between two fixes could be incorporated into the final approach procedure by computing the distances between the two. In another example, data representative of the vertical angle information of the glidepath (which could be the negative value of the GPA) could be incorporated into the final approach procedure; if such incorporation is made, it could be made to a GPA with a value other than a standard value. In another example, data representative of distance information between two fixes could be incorporated into the final approach procedure by computing the distances between the two. In another example, data representative of path geometry could be incorporated into the final approach procedure including, but not limited to, defining the leg types between the fix or fixes as a track to a fix ("TF") which a known descriptor field commonly employed by an FMS. In another example, data representative of altitude description information could be incorporated into the final approach procedure to describe a waypoint crossing characteristic appropriate for the waypoint.

The flowchart continues with module 616 with the providing of data representative of the final approach procedure to at least one avionics system. In one embodiment, the system could be an FMS. In another embodiment, the system could be display units. Display units may include, but are not limited to, a tactical display unit, a strategic display unit, a HUD unit, or a display unit which may display approach path information. As embodied herein, final approach procedure data could be used, in part or in whole, in the generation of a flight route corridor image. In another embodiment, the avionics system could be a vision system which generates an image data set which represents the image displayed on a display unit. Vision systems include, but are not limited to, SVS, EVS, combined SVS-EVS, or combination thereof. As embodied herein, final approach procedure data could be included, in part or in whole, in the generation of an image data set. As embodied herein, the image represented the image data set could include an image of a flight route corridor. Then, the flowchart ends.

It should be noted that, although missed approach data may be included as part of a published approach procedure, there could be an occasion where only a final approach procedure is needed or may be useful without the inclusion of a missed approach procedure. For example, student and/or flight crew training may want to emphasize flying a final approach procedure up through a missed approach point or decision altitude point, at which time a choice could be made to practice a final approach procedure, thereby bypassing the practice of flying a missed approach procedure and the added expense (e.g., fuel expense).

FIG. 15 depicts a flowchart 700 of an example of a second method for generating procedure data used in an avionics system. The flowchart begins with module 702 with the defining of a missed approach path. A missed approach path may include a transition between the glidepath and a climb path, where the glidepath may be represented in the final approach procedure data generated in module 614. A climb path may have a constant climb gradient. A missed approach path may comprise of one or more ascertainable points. One of the ascertainable points through which the missed approach path could pass may be the decision altitude point determined in module 612. One or more points could be points determined by approach design criteria. One or more points could be existing waypoints and altitudes. One or more points could correspond to existing waypoints contained in an existing or published approach procedure, where the waypoints could be used to describe fixes of an approach procedure including, but not limited to, RNAV waypoints, ground-based NAVAIDs, navigation fixes defined using ground-based NAVAIDs, and point(s) on a runway.

In one embodiment, data representative of an existing or published approach procedure may be used to establish a missed approach path as embodied herein. For instance, a climb gradient of an existing approach procedure may be used. In an embodiment disclosed herein, a climb path associated with a missed approach could be defined by two or more fixes of a published or established approach procedure. For example, the location of a first fix could be a decision altitude point, and the location of a second fix could be a holding fix or some other fix signifying the terminating end of the missed approach fix. The height of the first fix could be defined as the value of a decision altitude, and the height of the second fix could correspond to the altitude assigned in the published or existing approach procedure.

If an existing or published approach procedure has not been established for the runway or is unavailable for use because of, for example, a restriction based on a category of the aircraft, alternative means may be employed to establish a missed approach path. In one embodiment, an existing or published ODP or SID could be used as a missed approach path as discussed herein. In another embodiment, a missed approach path may be derived through an iterative process such as, but not limited to, the process discussed above. In another embodiment, a missed approach path may be derived through a path construction function. As discussed above, the employment of a path construction function could produce a curved missed approach path. If a path construction function is employed, the design criteria functions applicable to a straight path could still be applied to a curved path. For example, the distance along the missed approach course could be applied as the distance along the curved path is used, from where width of an OCS may be determined for the purpose of examining for object penetration. Moreover, restrictions or limitations could apply to a curved path.

The flowchart continues with module 704 with the construction of a missed approach OCS. As discussed herein, the missed approach OCS may be constructed using missed approach design criteria. Data representative of the final approach OCS constructed in module 606 and, if it was necessary, adjusted in module 610 could be used in the missed approach design criteria. Also, final approach procedure data generated in module 614 may be used by missed approach design criteria.

The flowchart continues with module 706 with the examining of the missed approach OCS for object penetration. Missed approach design criteria may be applied to determine whether object penetration has occurred, that is, whether the vertical measurement of at least one object exceeds the vertical measurement of the OCS at the location of the object. If the height or elevation of at least one object exceeds the height or elevation of the OCS at the location of the object, object penetration has occurred.

The flowchart continues with module 708 with the adjusting of the missed approach OCS using missed approach design criteria if necessary. The adjustment may be necessary if an object is penetrating the OCS and no remedy exists to address the penetration or to allow the use of a penetrated OCS. In one embodiment, the adjustment of the OCS could be made by adopting a CG indicative of real-time aircraft climb performance that has been computed using one or more input factors 150. In an alternative embodiment, an adjustment could be made through the use of an iterative process. In an alternative embodiment, an adjustment could be made through the use of a path construction function.

In an alternative embodiment, the adjustment of the missed approach OCS could depend on a minimum obstacle clearance distance between the penetrating object and the climb path at a corresponding location of the penetrating object. The height or elevation of the climb path could be vertically offset by the value of a minimum obstacle clearance distance. The value of a minimum obstacle clearance distance could be fixed or variable determined as a function of one or more criteria by a manufacturer or end user. For example, it may be determined as a function of alerting criteria established for a TAWS system. For each penetrating object, if the height or elevation of the object does not exceed the height or elevation of the vertically offset climb path corresponding to the location of the object, then the adjustment to the OCS may not be necessary. In another embodiment, the adjustment of the OCS could depend on both the adoption of an estimated aircraft climb performance indicator as the CG and the use of the minimum obstacle clearance distance.

The flowchart continues with module 710 with the modifying of the applicable decision altitude data determined in module 612. Applicability of the decision altitude data may depend on whether the missed approach OCS was adjusted. If the missed approach OCS was adjusted, then the modified applicable decision altitude data may become the applicable decision altitude data of module 612 and used in the generation of data representative of a final approach procedure of module 614.

If a modification is made, it could be limited, where such limitation could be based on final approach design criteria. For example, the values of LTP(elev) and GPA of the glidepath may be limited by final approach design criteria, where such limitation could be based on the category of aircraft. Then, the flowchart ends.

FIG. 16 depicts a flowchart 800 of an example of a third method for generating procedure data used in an avionics system. The flowchart begins with module 802 which could perform the same function as disclosed in modules 602.

The flowchart continues with module 804 with the defining of a flight path for a departure path. The departure path for a departure procedure could be a climb path. A climb path may have a constant CG. A departure path may comprise of one or more ascertainable points. One point of a climb path may a LTP for the opposite runway of take-off, and another point could be a waypoint along the proposed flight path. One or more points could correspond to existing waypoints contained in a published procedure, where the waypoints may establish a specific location (e.g., longitude/latitude coordinate) and could be used to describe a variety of fixes in a procedure including, but not limited to, RNAV waypoints, ground-based NAVAIDs, navigation fixes defined using ground-based NAVAIDs, and point(s) on a runway.

In one embodiment, data representative of an existing or published procedure may be used to establish a departure path as embodied herein. For instance, a CG of an existing departure procedure may be used. In an embodiment disclosed herein, a climb path associated with a departure flight path could be defined by at least one fix of a published or established departure procedure. For example, the location of one fix could be a designated end of the runway ("DER"); a location of a second fix could be an ascertainable terminating altitude along the departure path. The height of the first fix could be defined as a DER elevation, and the height of the second fix could be determined as a terminating altitude as determined by design criteria.

If an existing or published departure procedure has not been established for the runway or is unavailable for use because of, for example, a restriction based on a category of the aircraft, alternative means may be employed to establish a climb path. In one embodiment, a climb path may be derived through an iterative process such as, but not limited to, the process discussed above. In another embodiment, a climb path may be derived through a path construction function. As discussed above, the employment of a path construction function could produce a curved flight path. If a path construction function is employed, the design criteria functions applicable to a straight path could still be applied to a curved path. For example, any distance measured along the curved path could be used for the purpose of examining for object penetration. Moreover, restrictions or limitations associated with a departure path could apply to a curved path.

The flowchart continues with module 806 with the construction of an OCS for a departure path. As discussed herein, the OCS may be constructed using departure procedure design criteria. Design criteria could include data representative of the climb path such as, but not limited to, CG. Also, design criteria could include navigation data representative of the runway and final approach procedure information such as, but not limited to, DER location and elevation.

The flowchart continues with module 808 with the examining of the OCS for object penetration. Design criteria may be applied to determine whether object penetration has occurred, that is, whether the vertical measurement of at least one object exceeds the vertical measurement of the OCS at the location of the object. If the height or elevation of at least one object exceeds the height or elevation of the OCS at the location of the object, object penetration has occurred.

The flowchart continues with module 810 with the adjusting of the OCS using design criteria if necessary. The adjustment may be necessary if an object is penetrating the OCS and no remedy exists to address the penetration or to allow the use of a penetrated OCS. In one embodiment, the adjustment of the OCS could be made by adopting a CG indicative of real-time aircraft climb performance that has been computed using one or more input factors 150. In an alternative embodiment, an adjustment could be made through the use of an iterative process. In an alternative embodiment, an adjustment could be made through the use of a path construction function.

In an alternative embodiment, the adjustment of the OCS could depend on a minimum obstacle clearance distance between the penetrating object and the climb path at a corresponding location of the penetrating object. The height or elevation of the climb path could be vertically offset by the value of a minimum obstacle clearance distance. The value of a minimum obstacle clearance distance could be fixed or variable determined as a function of one or more criteria by a manufacturer or end user. For example, it may be determined as a function of alerting criteria established for a TAWS system. For each penetrating object, if the height or elevation of the object does not exceed the height or elevation of the vertically offset climb path corresponding to the location of the object, then the adjustment to the OCS may not be necessary. If an adjustment is made, it could be limited.

The flowchart continues with module 812 with the generation of data representative of a departure procedure. The procedure could include a climb path passing through at least one fix. For example, a climb path could pass through a fix associated with a terminating altitude. The altitude of each fix could be determined using design criteria.

As embodied herein, a departure procedure could be constructed with a plurality of data. In one example, data representative of distance information to a waypoint could be incorporated into the procedure by computing the distance to the waypoint. In another example, data representative of the vertical angle information of the climb path could be incorporated into the procedure; if such incorporation is made, it could be made to a CG having a value other than a standard value. In another example, data representative of path geometry could be incorporated into the departure procedure including, but not limited to, defining the leg types between the fix or fixes as a track to a fix ("TF") which a known descriptor field commonly employed by an FMS. In another example, data representative of altitude description information could be incorporated into the final approach procedure to describe a waypoint crossing characteristic appropriate for the waypoint.

The flowchart continues with module 814 with the providing of data representative of the departure procedure to at least one avionics system. In one embodiment, the system could be an FMS. In another embodiment, the system could be display units. Display units may include, but are not limited to, a tactical display unit, a strategic display unit, a HUD unit, or a display unit which may display departure path information. As embodied herein, departure procedure data could be used, in part or in whole, in the generation of a flight route corridor image. In another embodiment, the avionics system could be a vision system which generates an image data set which represents the image displayed on a display unit. Vision systems include, but are not limited to, SVS, EVS, combined SVS-EVS, or combination thereof. As embodied herein, departure procedure data could be included, in part or in whole, in the generation of an image data set. As embodied herein, the image represented the image data set could include an image of a flight route corridor. Then, the flowchart ends.

It should be noted that the method steps described above could be embodied in computer-readable media including, but not limited to, computer instruction code. It shall be appreciated to those skilled in the art that not all method steps must be performed, nor must they be performed in the order stated. As embodied herein, the actions that could be performed by an processor 170 are included as method steps As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating procedure data used in an avionics system, such system comprising:
a source of navigation data;
a source of object data; and
a processor, configured to
receive navigation data and object data representative of navigation information and object information, respectively,
define a flight path,
construct an obstacle clearance surface ("OCS") applicable to the defined flight path,
examine the OCS for object penetration, where
a penetrated OCS is permissible if a remedy to allow the use of the penetrated OCS exists,
adjust the penetrated OCS if a remedy to allow the use of the penetrated OCS does not exist,
generate procedure data representative of an approach procedure, and
provide the procedure data to at least one avionics system configured to receive the procedure data.

2. The system of claim 1, wherein the source of object data includes a terrain database, an obstacle database, a non-database terrain and/or obstacle acquisition system, or a combination thereof.

3. The system of claim 1, wherein the processor is a processor of one avionics system.

4. The system of claim 3, wherein the processor is a processor of a flight management system, a vision system, or a display unit system.

5. The system of claim 1, wherein the navigation data includes runway data and waypoint data.

6. The system of claim 1, wherein the object data includes terrain data, obstacle data, or both.

7. The system of claim 1, wherein the flight path is defined using data associated with an existing or published flight procedure.

8. The system of claim 1, wherein an iterative process or a path construction function is used to define the flight path, used as a remedy to allow the use of the penetrated OCS, or both.

9. The system of claim 1, wherein minimum obstacle clearance distance criteria is used as a remedy to allow the use of the penetrated OCS.

10. The system of claim 1, wherein at least one avionics system configured to receive the procedure data includes the following: a flight management system, a vision system, or a display unit system.

11. The system of claim 1, wherein the defined flight path is a departure path.

12. The system of claim 11, further comprising:
a source of input factor data, and
the processor is further configured to
receive input factor data, where
the input factor data is used to define a climb gradient of the departure path, used as a remedy to allow the use of the penetrated OCS, or both.

13. The system of claim 1, wherein
the defined flight path is a final approach path, and
the generation of procedure data for the final approach path is based upon applicable decision altitude data, where
the processor is further configured to determine the applicable decision altitude data.

14. The system of claim 13, wherein the processor is further configured to
define a missed approach path,
construct a missed approach OCS,
examine the missed approach OCS for penetration, where
a penetrated missed approach OCS is permissible if a remedy to allow the use of the penetrated missed approach OCS exists,
adjust the penetrated missed approach OCS if a remedy to allow the use of the penetrated missed approach OCS does not exist, and
modify the applicable decision altitude data if the penetrated missed approach OCS has been adjusted.

15. The system of claim 14, wherein the missed approach path is defined using data associated with an existing or published approach procedure.

16. The system of claim 14, wherein an iterative process or a path construction function is used to define the missed approach path, used as a remedy to allow the use of the penetrated missed approach OCS, or both.

17. The system of claim 14, wherein minimum obstacle clearance distance criteria is used as a remedy to allow the use of the penetrated missed approach OCS.

18. The system of claim 14, further comprising:
a source of input factor data, and
the processor is further configured to
receive input factor data, where
the input factor data is used to define a climb gradient of the missed approach path, used as a remedy to allow the use of the penetrated missed approach OCS, or both.

19. A module for generating procedure data used in an avionics system, such module comprising:
an input communications interface to facilitate the receiving of data from at least one data source by a processor;
the processor configured to
receive navigation data and object data representative of navigation information and object information, respectively,
define a flight path,
construct an obstacle clearance surface ("OCS") applicable to the defined flight path,
examine the OCS for object penetration, where
a penetrated OCS is permissible if a remedy to allow the use of the penetrated OCS exists,
adjust the penetrated OCS if a remedy to allow the use of the penetrated OCS does not exist,
generate procedure data representative of an approach procedure, and
provide the procedure data to an output communications interface; and
the output communications interface to facilitate the providing of the procedure data to at least one avionics system.

20. The module of claim 19, wherein the module is a module of one avionics system.

21. The module of claim 20, wherein the module is a module of a flight management system, a vision system, or a display unit system.

22. The module of claim 19, wherein the navigation data includes runway data and waypoint data.

23. The module of claim 19, wherein the object data includes terrain data, obstacle data, or both.

24. The module of claim 19, wherein the flight path is defined using data associated with an existing or published flight procedure.

25. The module of claim 19, wherein an iterative process or a path construction function is used to define the flight path, used as a remedy to allow the use of the penetrated OCS, or both.

26. The module of claim 19, wherein minimum obstacle clearance distance criteria is used as a remedy to allow the use of the penetrated OCS.

27. The module of claim 19, wherein the defined flight path is a departure path.

28. The module of claim 27, wherein the processor is further configured to
receive input factor data, where
the input factor data is used to define a climb gradient of the departure path, used as a remedy to allow the use of the penetrated OCS, or both.

29. The module of claim 19, wherein
the defined flight path is a final approach path, and
the generation of procedure data for the final approach path is based upon applicable decision altitude data, where
the processor is further configured to determine the applicable decision altitude data.

30. The module of claim 29, wherein
the processor is further configured to
define a missed approach path,
construct a missed approach OCS,
examine the missed approach OCS for penetration, where
a penetrated missed approach OCS is permissible if a remedy to allow the use of the penetrated missed approach OCS exists,
adjust the penetrated missed approach OCS if a remedy to allow the use of the penetrated missed approach OCS does not exist, and
modify the applicable decision altitude data if the missed approach OCS has been adjusted.

31. The module of claim 30, wherein the missed approach path is defined using data associated with an existing or published approach procedure.

32. The module of claim 30, wherein an iterative process or a path construction function is used to define the missed approach path, used as a remedy to allow the use of the penetrated missed approach OCS, or both.

33. The module of claim 30, wherein minimum obstacle clearance distance criteria is used as a remedy to allow the use of the penetrated missed approach OCS.

34. The module of claim 30, wherein the processor is further configured to
receive input factor data, where
the input factor data is used to define a climb gradient of the missed approach path, used as a remedy to allow the use of the penetrated missed approach OCS, or both.

35. A method for generating procedure data used in an avionics system, the method comprising:
performing the following steps, where the steps are performed by a processor:
receiving navigation data and object data representative of navigation information and object information, respectively;
defining a flight path;
constructing an obstacle clearance surface ("OCS") applicable to the defined flight path;
examining the OCS for object penetration, where
a penetrated OCS is permissible if a remedy to allow the use of the penetrated OCS exists;
adjusting the penetrated OCS if a remedy to allow the use of the penetrated OCS does not exist;
generating procedure data representative of an approach procedure; and
providing the procedure data to at least one avionics system.

36. The method of claim 35, wherein the navigation data includes runway data and waypoint data.

37. The method of claim 35, wherein the object data includes terrain data, obstacle data, or both.

38. The method of claim 35, wherein the flight path is defined using data associated with an existing or published flight procedure.

39. The method of claim 35, wherein an iterative process or a path construction function is used to define the flight path, used as a remedy to allow the use of the penetrated OCS, or both.

40. The method of claim 35, wherein minimum obstacle clearance distance criteria is used as a remedy to allow the use of the penetrated OCS.

41. The method of claim 35, wherein the defined flight path is a departure path.

42. The method of claim 41, further comprising:
receiving input factor data, where
the input factor data is used to define a climb gradient of the departure path, used as a remedy to allow the use of the penetrated OCS, or both.

43. The method of claim 35, wherein
the defined flight path is a final approach path, and
the generation of procedure data for the final approach path is based upon applicable decision altitude data.

44. The method of claim 43, further comprising:
defining a missed approach path;
constructing a missed approach OCS;
examining the missed approach OCS for penetration, where
a penetrated missed approach OCS is permissible if a remedy to allow the use of the penetrated missed approach OCS exists;
adjusting the penetrated missed approach OCS if a remedy to allow the use of the penetrated OCS does not exist; and
modifying the applicable decision altitude data if the penetrated missed approach OCS has been adjusted.

45. The method of claim 44, wherein the missed approach path is defined using data associated with an existing or published approach procedure.

46. The method of claim 44, wherein an iterative process or a path construction function is used to define the missed approach path, used as a remedy to allow the use of the penetrated missed approach OCS, or both.

47. The method of claim 44, wherein minimum obstacle clearance distance criteria is used as a remedy to allow the use of the penetrated missed approach OCS.

48. The method of claim 44, further comprising:
receiving input factor data, where
the input factor data is used to define a climb gradient of the missed approach path, used as a remedy to allow the use of the penetrated missed approach OCS, or both.

* * * * *